US008136296B2

(12) United States Patent  (10) Patent No.: US 8,136,296 B2
Hogan  (45) Date of Patent: Mar. 20, 2012

(54) RELEASABLY INTEGRATED STRUCTURAL PLANTER AND ADJUSTABLE IRRIGATION SYSTEM FOR CONTROLLABLY WATERING THE PLANTER AND TERRAIN

(76) Inventor: James Hogan, Jacksonville, FL (US)

( * ) Notice: Subject to any disclaimer, the term of this patent is extended or adjusted under 35 U.S.C. 154(b) by 388 days.

(21) Appl. No.: 12/026,553

(22) Filed: Feb. 5, 2008

(65) Prior Publication Data

US 2009/0090051 A1  Apr. 9, 2009

Related U.S. Application Data

(63) Continuation-in-part of application No. 11/868,534, filed on Oct. 8, 2007.

(51) Int. Cl.
*A01G 9/02* (2006.01)
(52) U.S. Cl. ....... 47/83; 47/79; 47/65.5; 47/82; 47/66.7; 47/39
(58) Field of Classification Search .............. 47/83, 79, 47/65.5, 67, 66.6, 82, 66.7, 39, 59 R, 62 R, 47/63, 65, 41.14, 41.11; 211/88.03, 85.23, 211/86.01, 87.01, 94.01, 196, 205, 107, 40; 248/218.4, 219.1, 216.1, 227.3, 312.1, 219.3, 248/27.8; *A47G 7/00, 7/02, 7/04*
See application file for complete search history.

(56) References Cited

U.S. PATENT DOCUMENTS

| | | | | |
|---|---|---|---|---|
| 248,519 A * | 10/1881 | Snyder | ........................ | 47/41.01 |
| 1,240,908 A * | 9/1917 | Weiss et al. | ................ | 211/133.3 |
| 2,387,982 A * | 10/1945 | Demuth | ..................... | 248/312.1 |
| 2,427,416 A * | 9/1947 | Petersen | ..................... | 248/312.1 |
| 4,033,072 A * | 7/1977 | Kobayashi et al. | ........... | 47/62 R |
| 4,380,136 A * | 4/1983 | Karpisek | ............................ | 47/83 |
| 4,419,843 A * | 12/1983 | Johnson, Sr. | ...................... | 47/82 |
| 4,896,456 A * | 1/1990 | Grant | ................................ | 47/67 |
| 5,265,376 A * | 11/1993 | Less | ................................ | 47/83 |
| 5,502,922 A * | 4/1996 | Shlomo | ........................ | 47/62 R |
| 5,598,662 A * | 2/1997 | Droste | ............................ | 47/39 |
| 6,003,824 A * | 12/1999 | Peterson et al. | ........... | 248/312.1 |
| 6,513,284 B1 * | 2/2003 | Sandlin | ........................ | 47/66.6 |
| 6,606,996 B1 * | 8/2003 | Thornell et al. | .............. | 131/241 |
| 2004/0035049 A1 * | 2/2004 | McLarty | ........................... | 47/39 |
| 2009/0000189 A1 * | 1/2009 | Black | ............................... | 47/82 |

FOREIGN PATENT DOCUMENTS

| | | | | |
|---|---|---|---|---|
| GB | 2123679 A | * | 7/1982 | |
| JP | 54-104021 | * | 8/1979 | |
| JP | 10-179357 | * | 7/1998 | |
| JP | 2002-325512 | * | 11/2002 | |

* cited by examiner

*Primary Examiner* — Andrea Valenti
(74) *Attorney, Agent, or Firm* — Mark Young, PA

(57) ABSTRACT

Planter systems include planters releasably integrated with a support structure primarily by releasable and penetrable engagement that is sufficient to support the planter without requiring conventional attachment devices. Engaging portions of the planters are releasably and penetrably received and concealed by the support structure to provide an integrated appearance. The planter systems optionally include adjustable irrigation systems configured to controllably supply water to the planter and/or surrounding terrain.

22 Claims, 29 Drawing Sheets

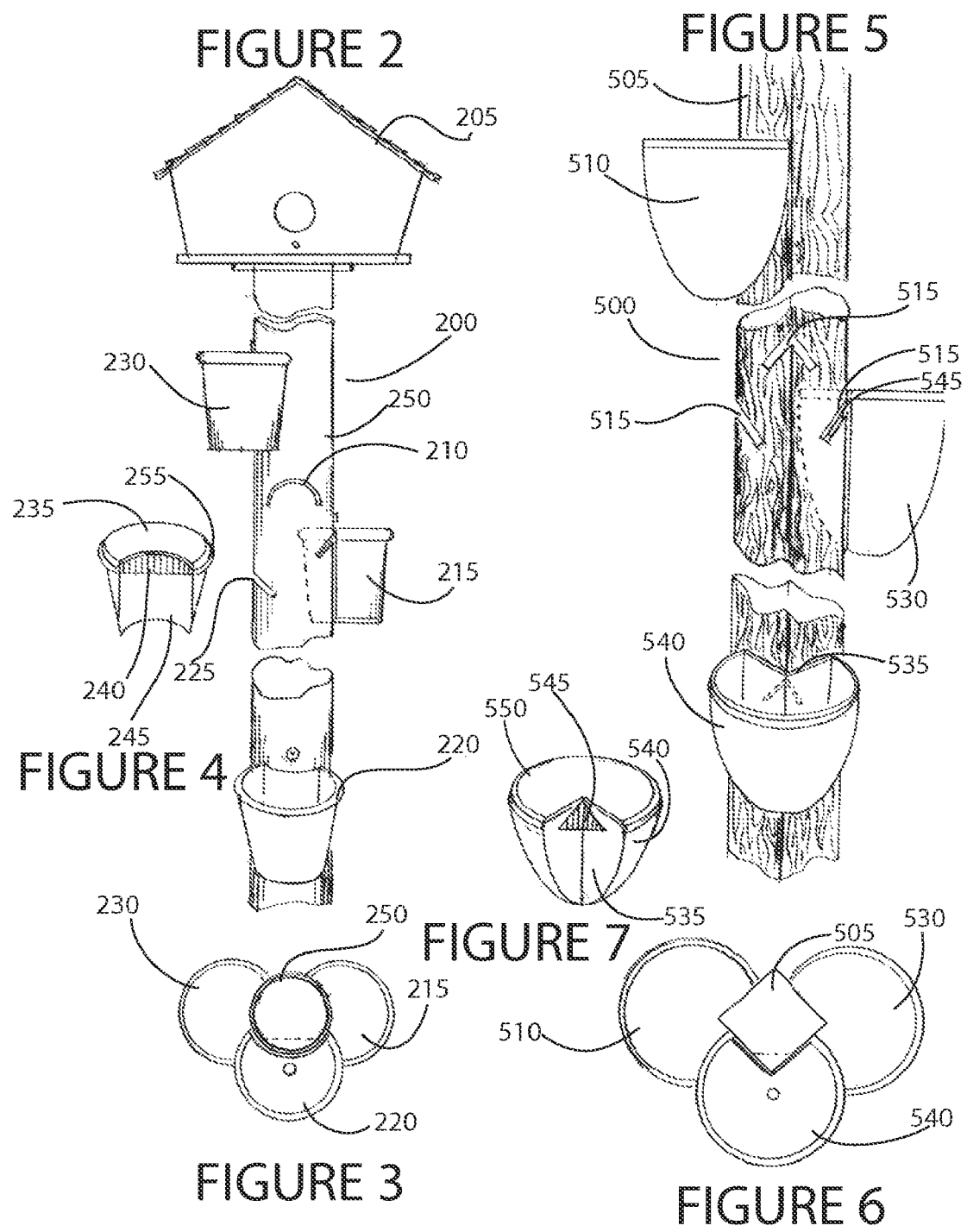

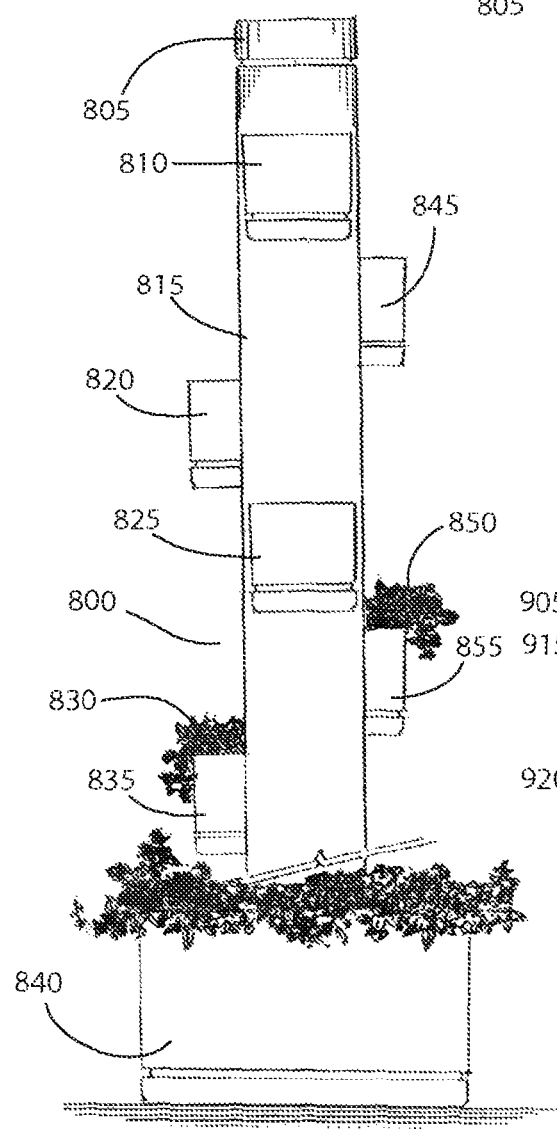
FIGURE 8
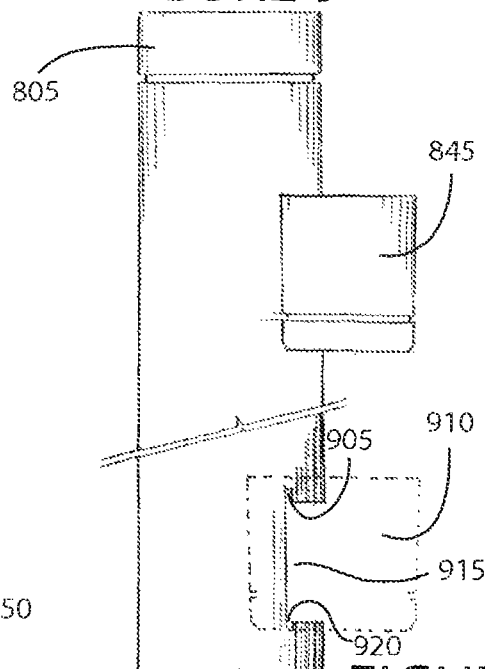
FIGURE 9
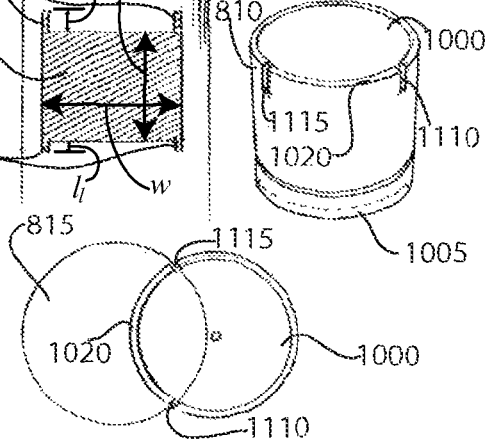
FIGURE 10
FIGURE 11

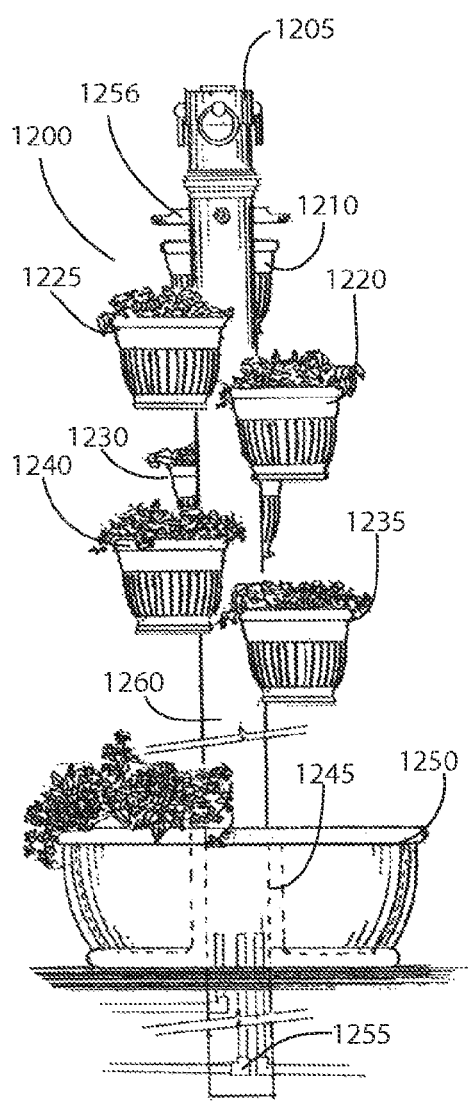
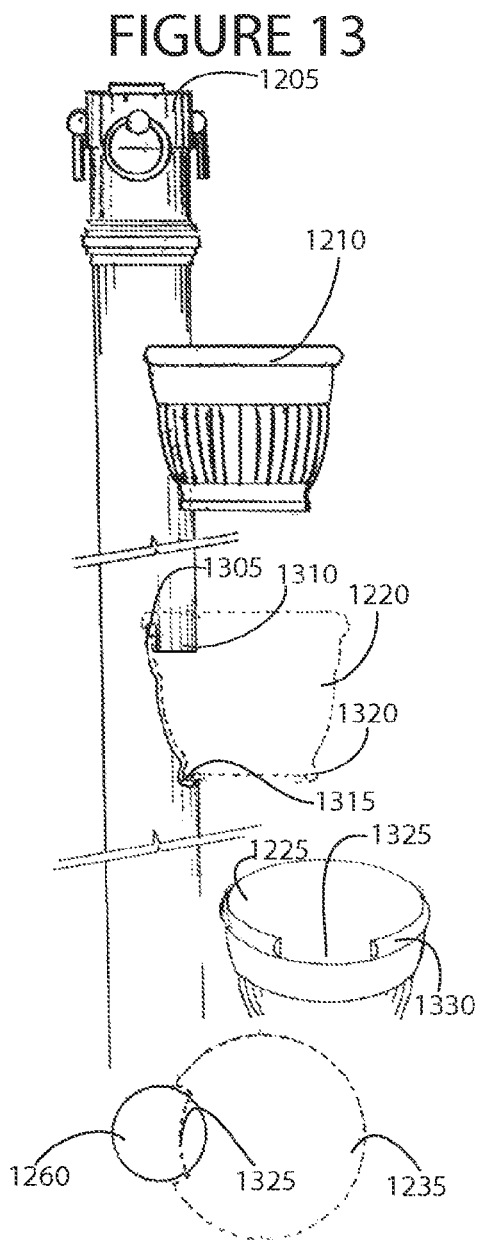
FIGURE 12
FIGURE 13
FIGURE 14

FIGURE 18
FIGURE 19
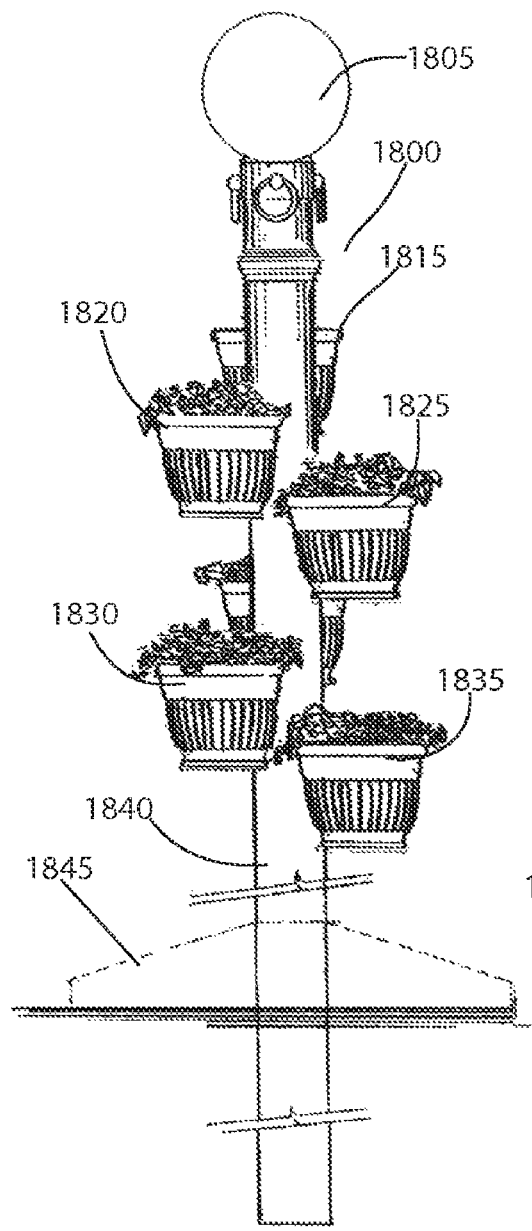
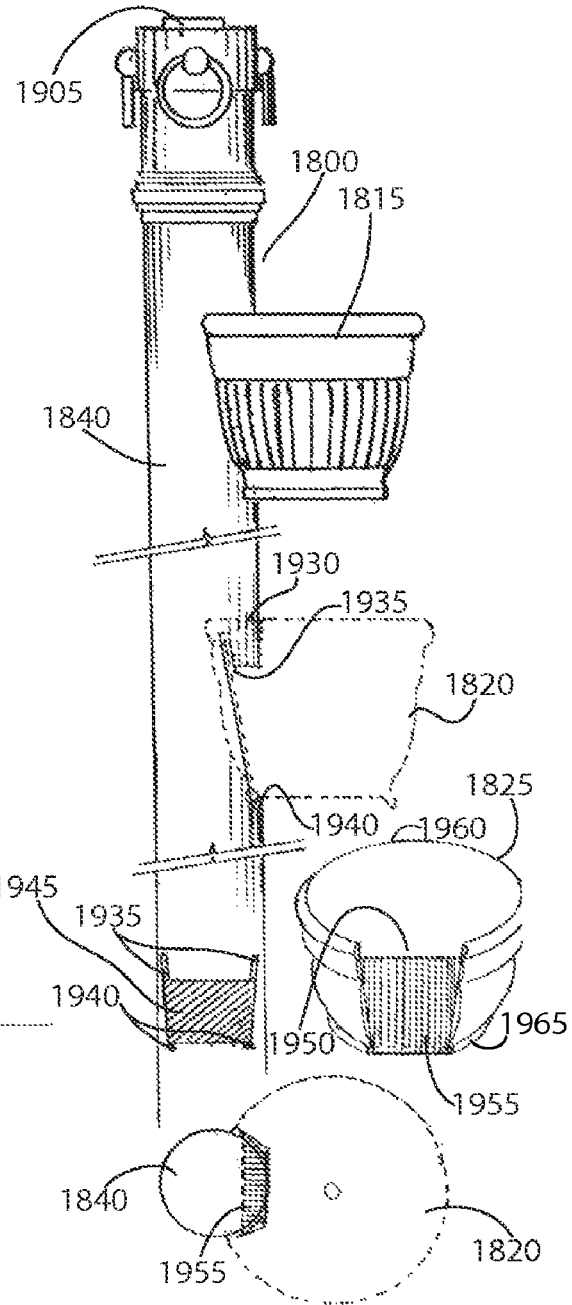
FIGURE 20

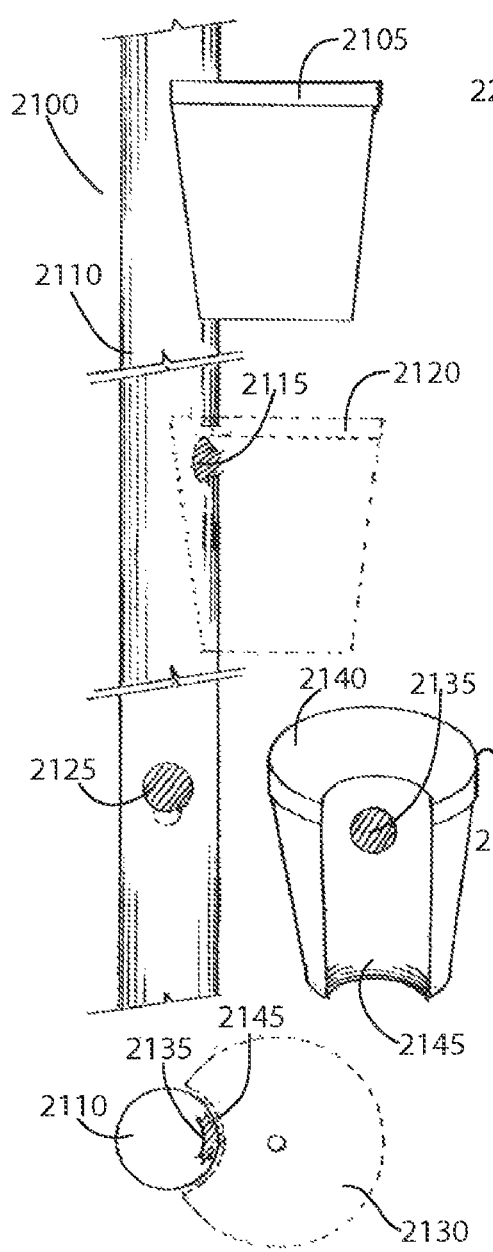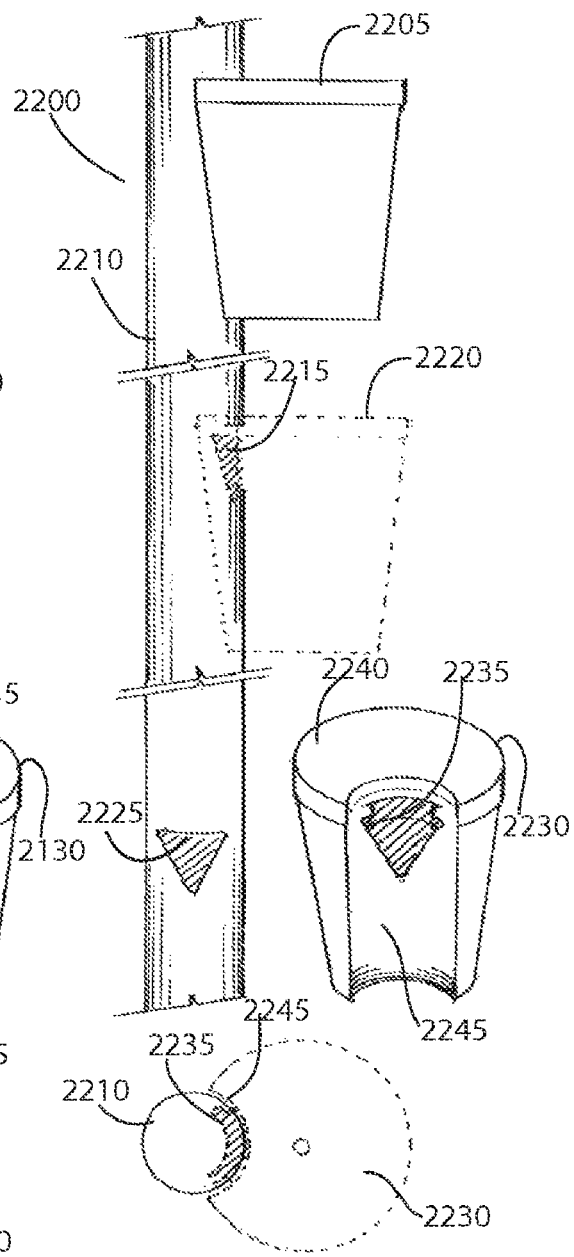

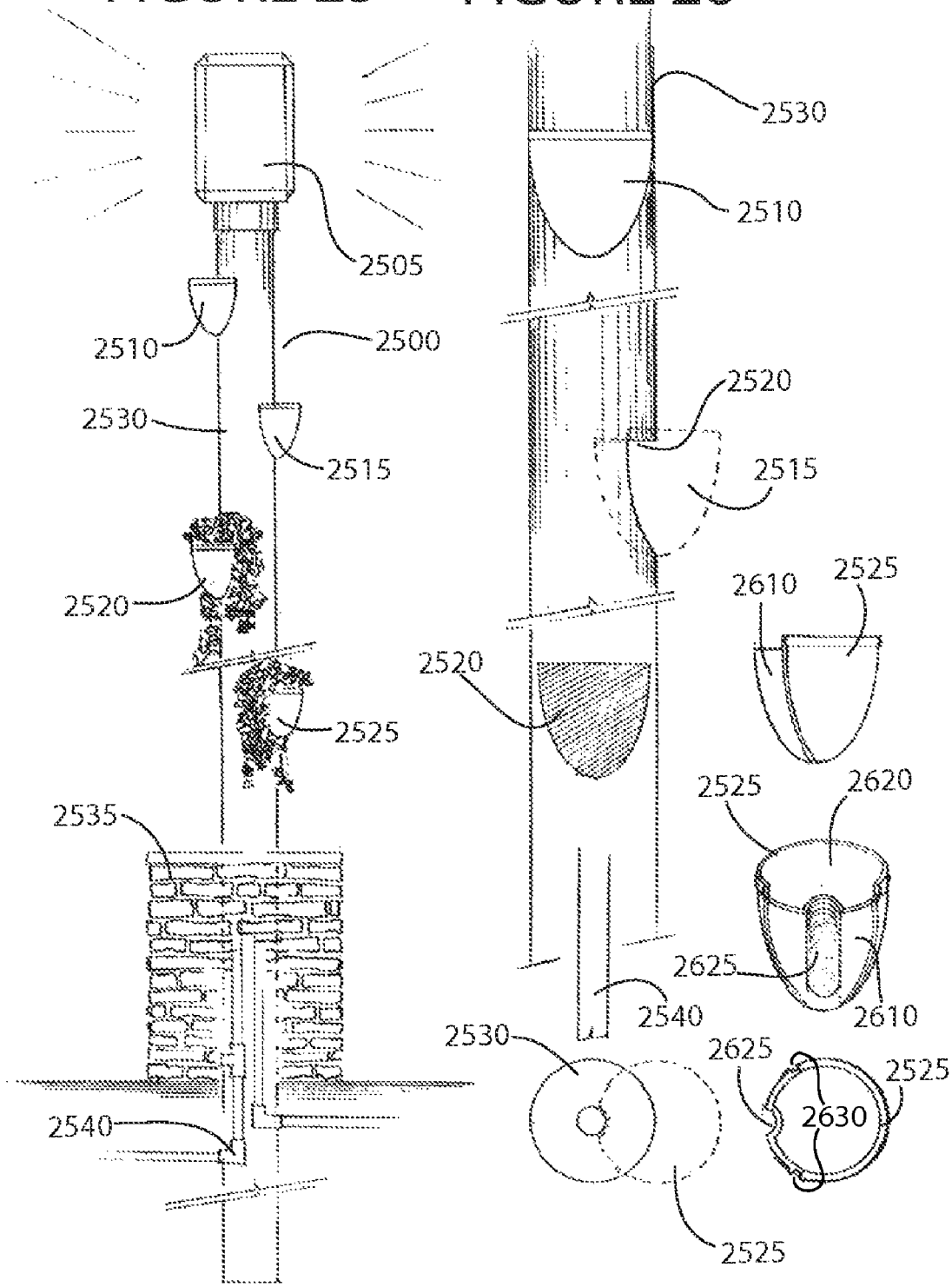

FIGURE 29
FIGURE 30
FIGURE 31
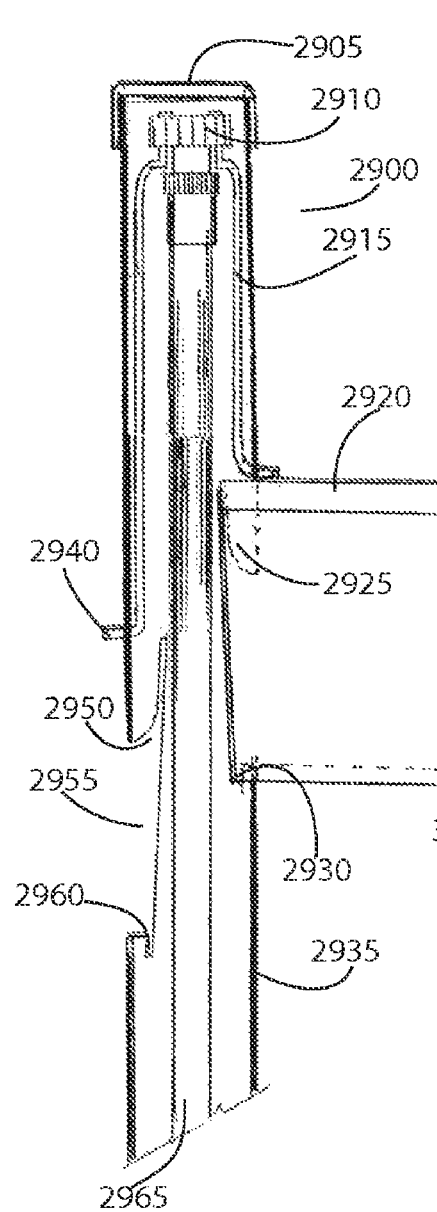
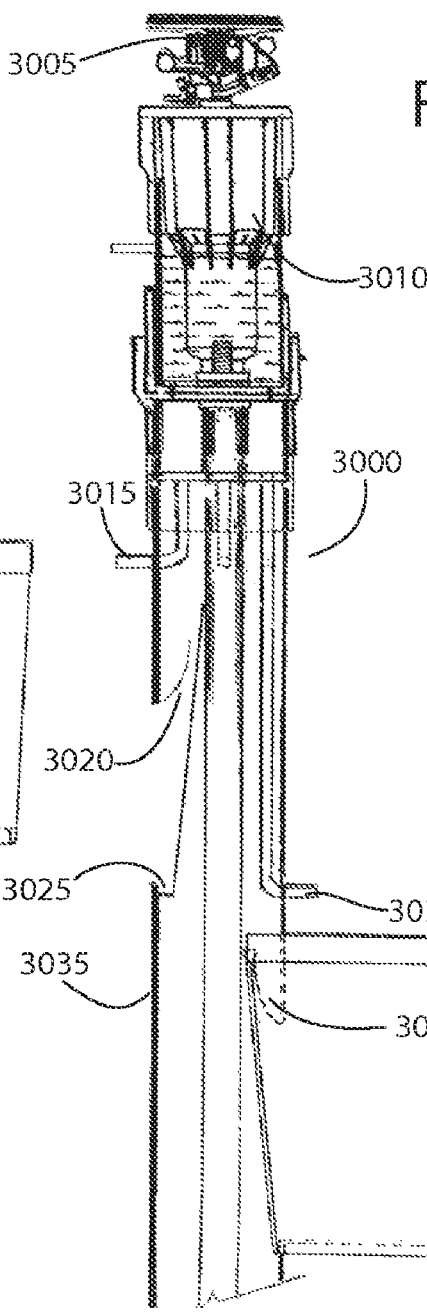
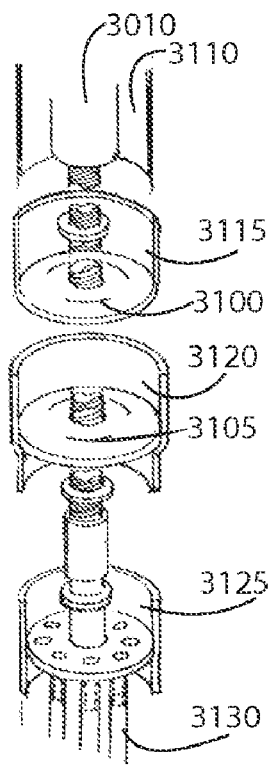

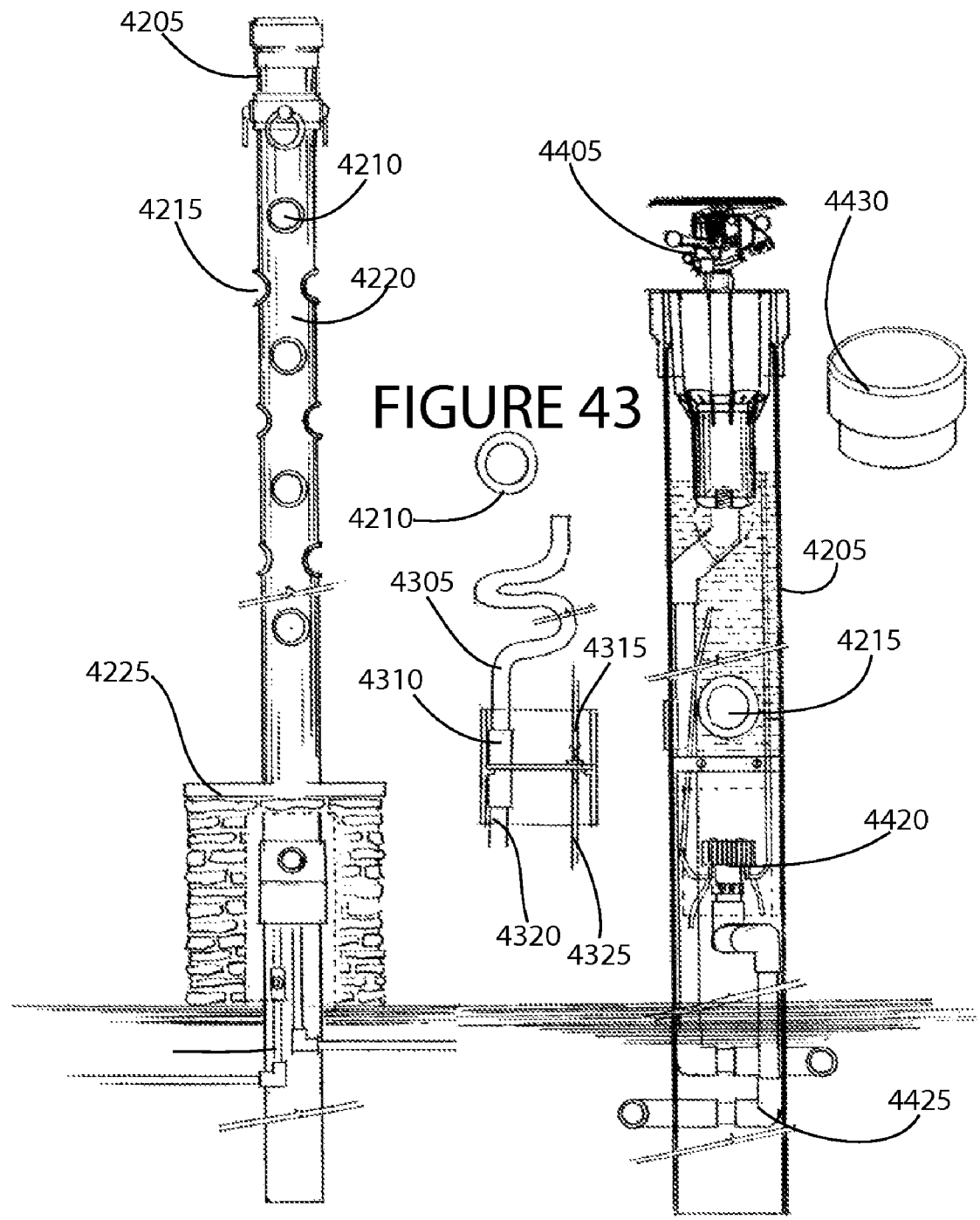

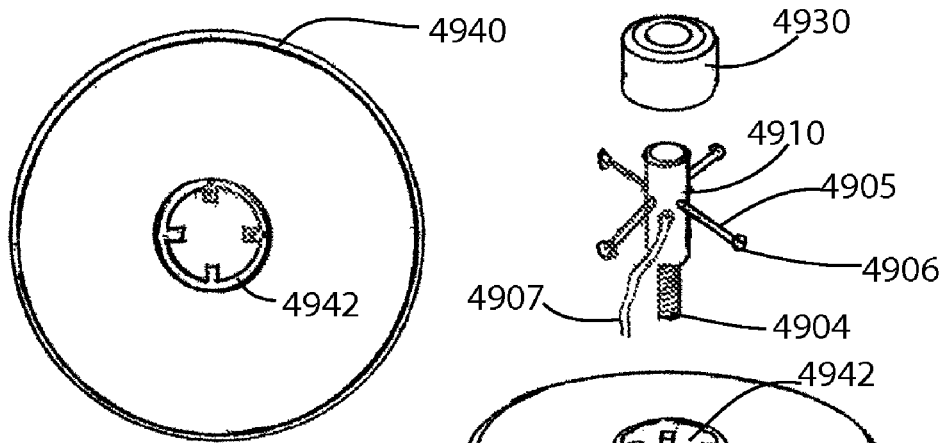
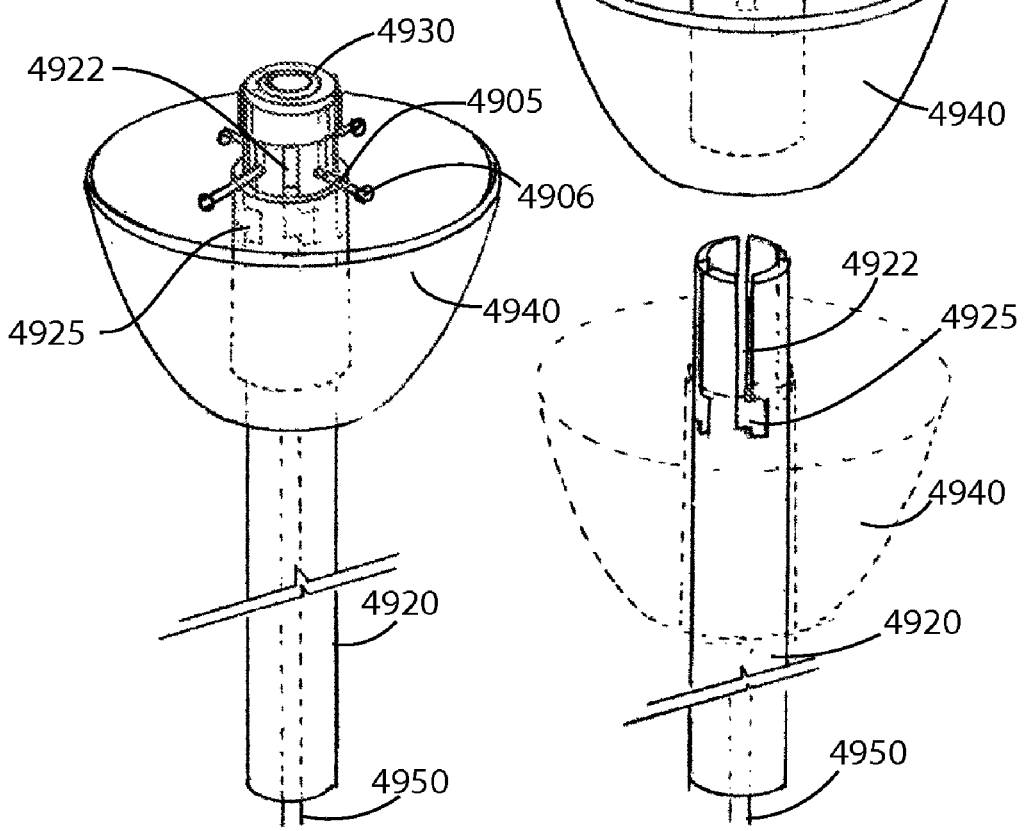
FIGURE 48
FIGURE 47
FIGURE 49

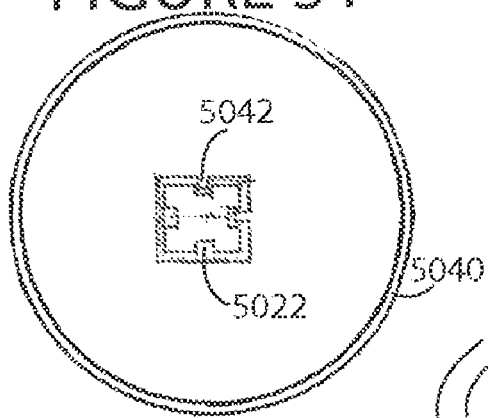
FIGURE 51
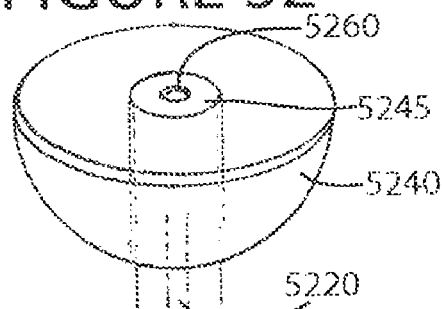
FIGURE 52
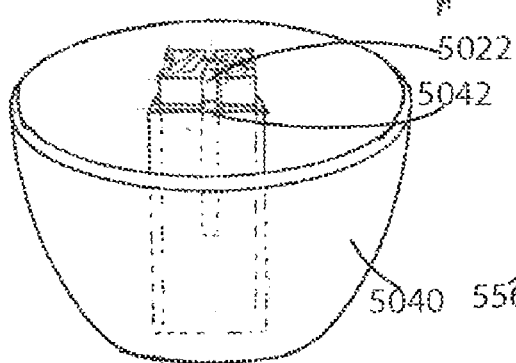
FIGURE 50
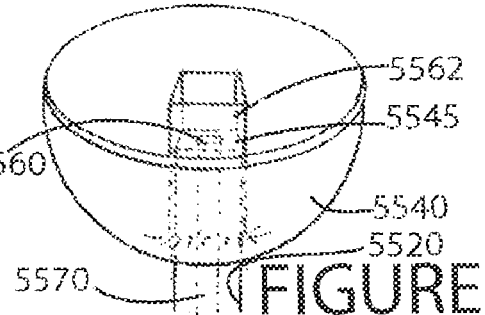
FIGURE 53
FIGURE 54
FIGURE 55
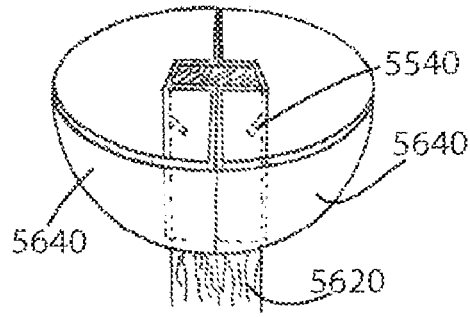
FIGURE 56

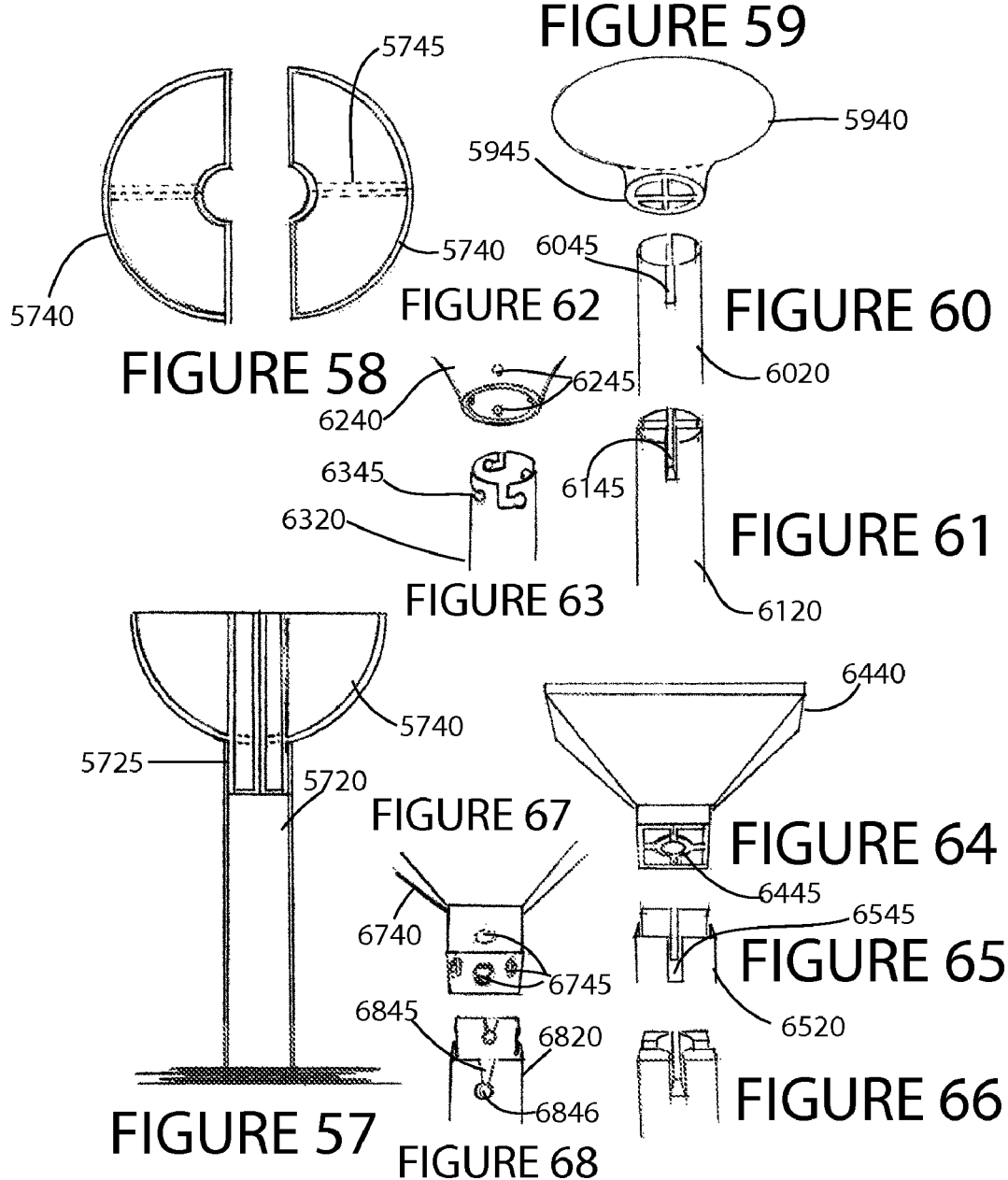

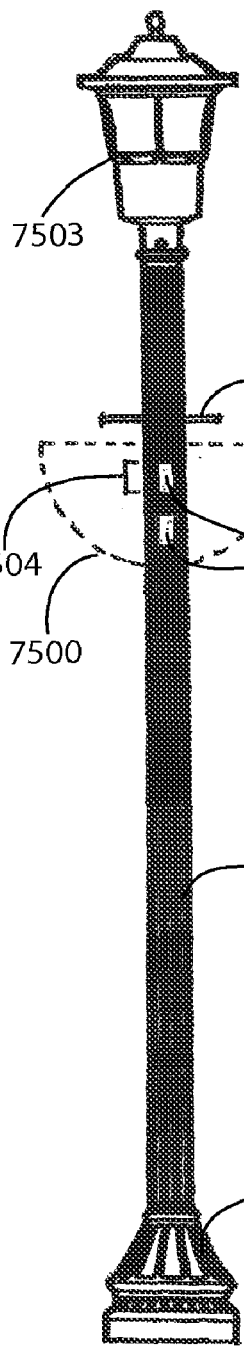
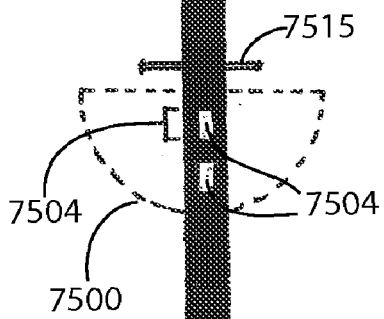
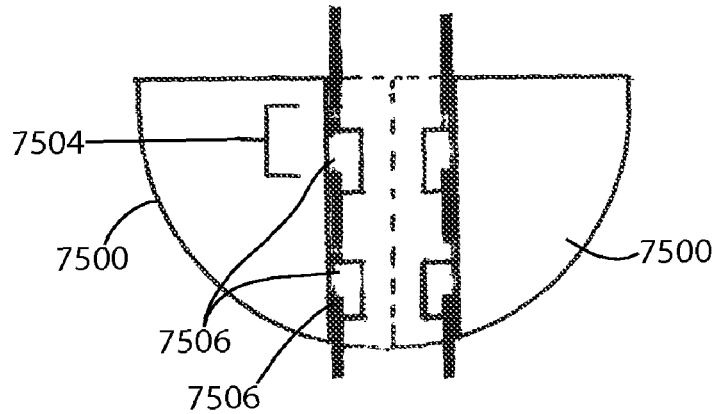
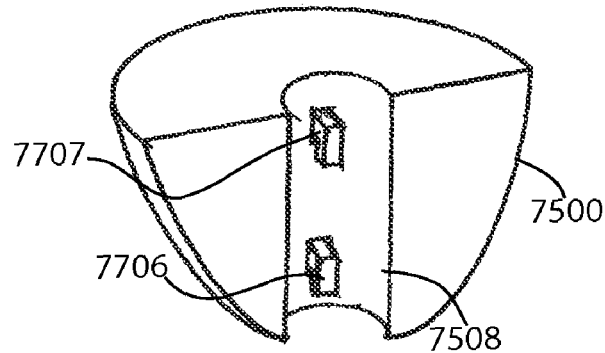
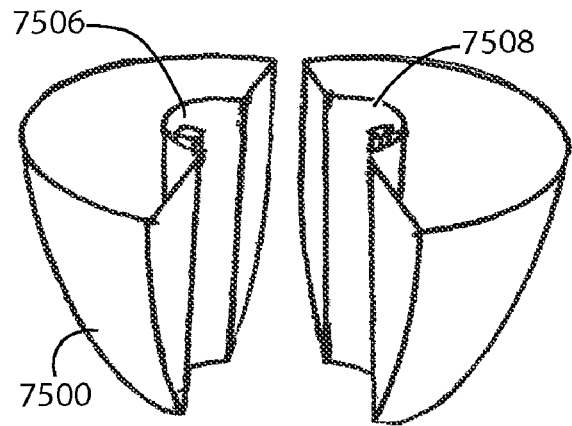
FIGURE 75
FIGURE 76
FIGURE 77
FIGURE 78

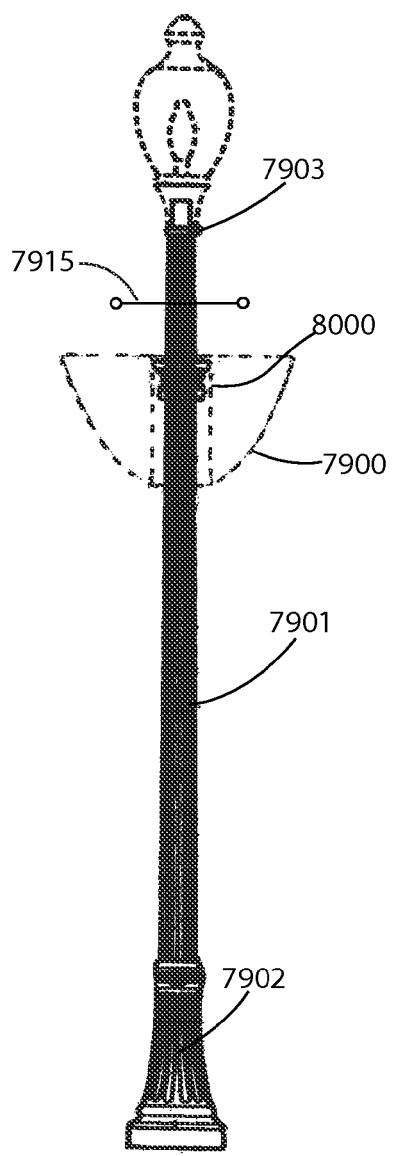
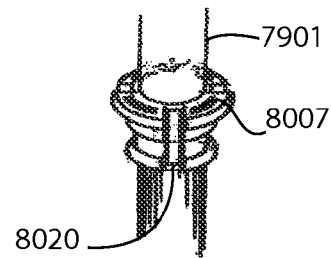
FIGURE 80
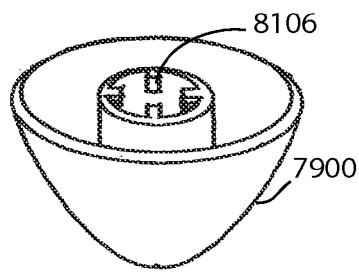
FIGURE 81
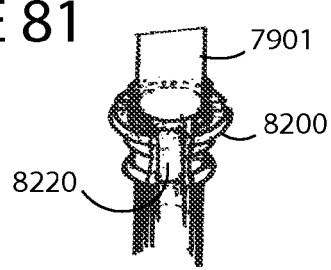
FIGURE 82
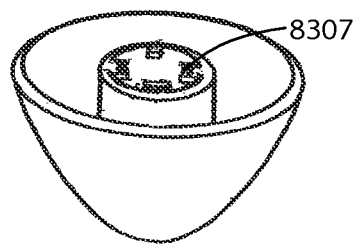
FIGURE 83
FIGURE 79

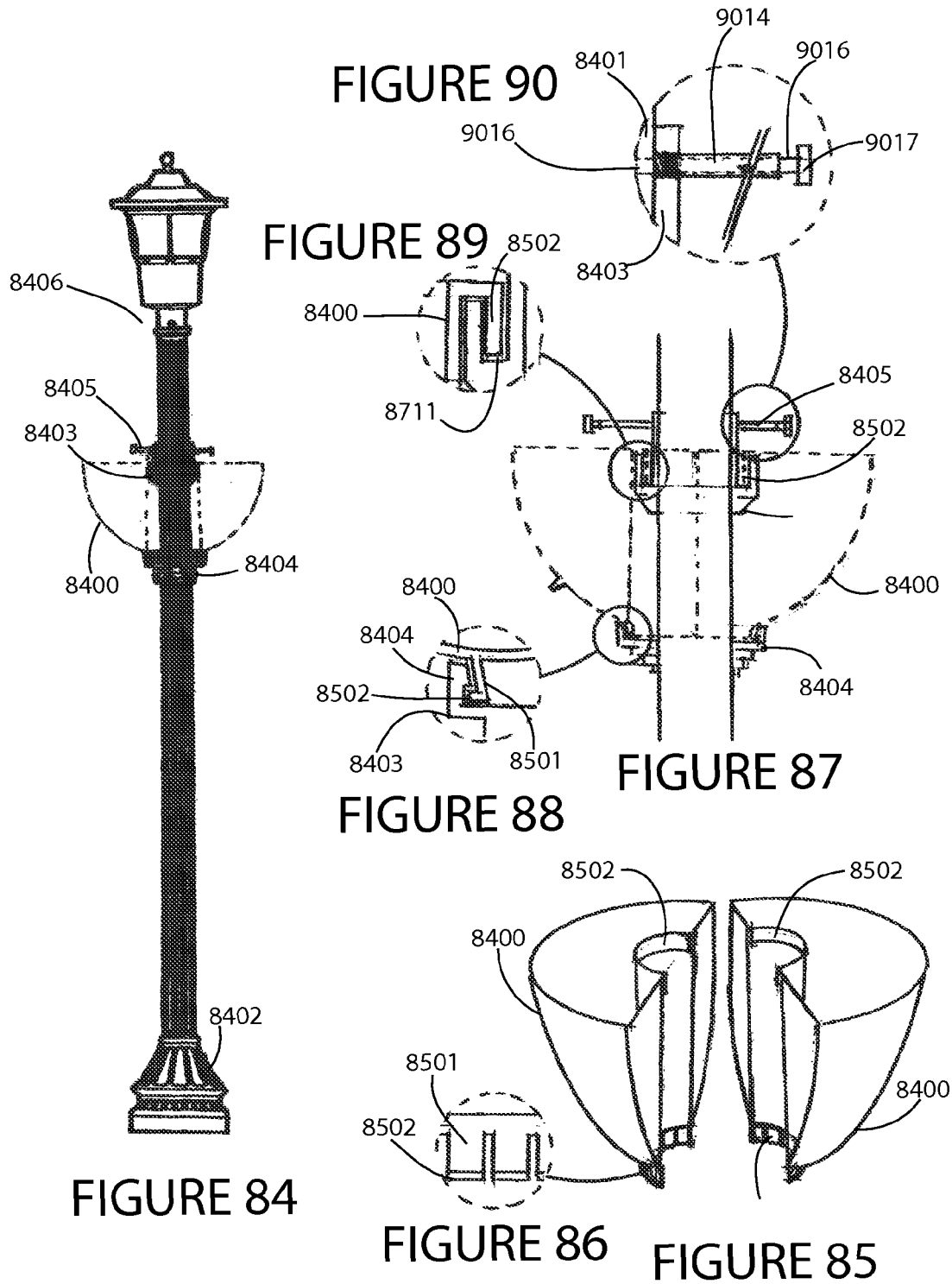

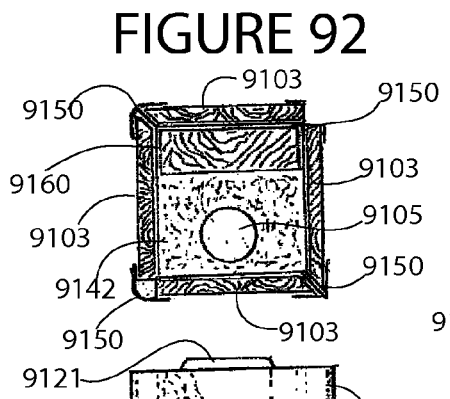
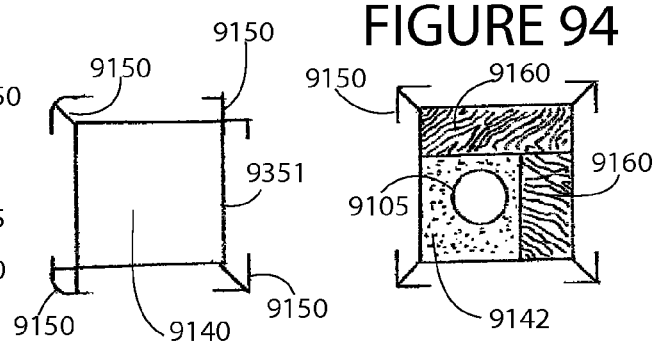
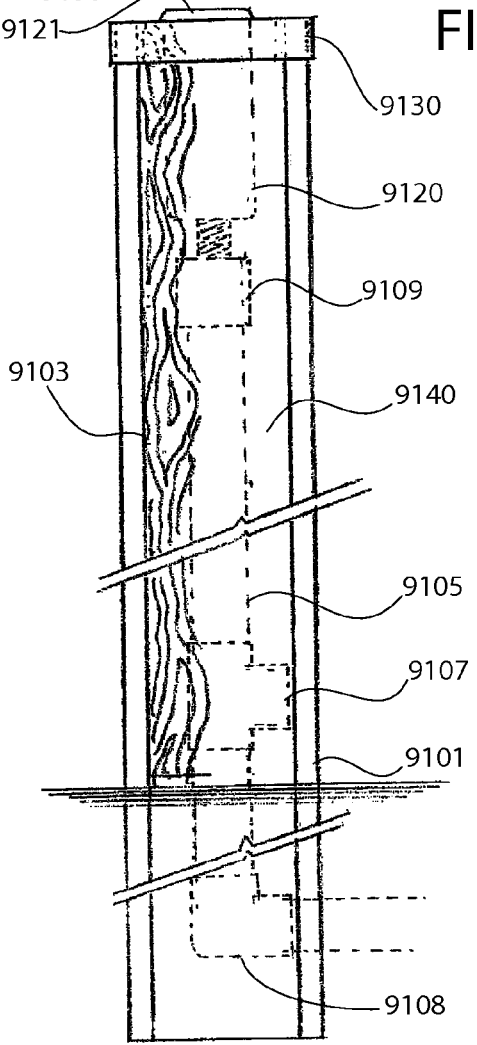
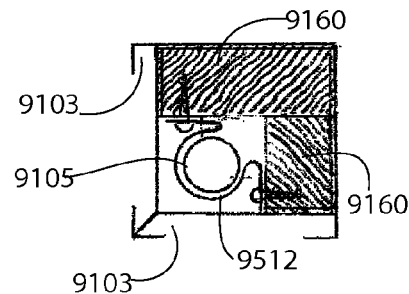
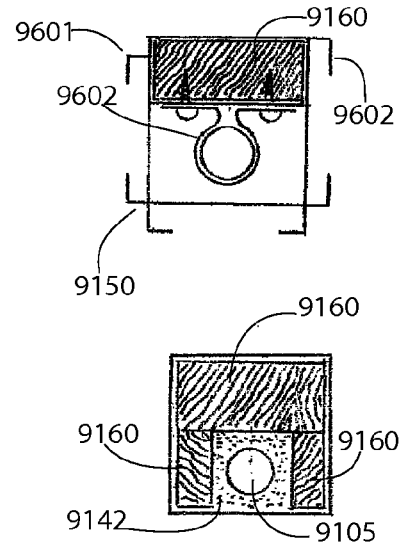
FIGURE 92    FIGURE 94
FIGURE 93
FIGURE 95
FIGURE 96
FIGURE 91    FIGURE 97

RELEASABLY INTEGRATED STRUCTURAL PLANTER AND ADJUSTABLE IRRIGATION SYSTEM FOR CONTROLLABLY WATERING THE PLANTER AND TERRAIN

RELATED APPLICATION

This application is a continuation in part and claims the benefit of priority of pending U.S. nonprovisional application Ser. No. 11/868,534, filed Oct. 8, 2007, the entire contents of which are incorporated herein by this reference.

FIELD OF THE INVENTION

This invention generally relates to planters and support structures, and more particularly, to planters releasably integrated with a support structure primarily by releasable and penetrable engagement that is sufficient to support the planter without requiring conventional attachment devices, but may use conventional attachment devices to bolster the support, whereby engaging portions of the planters are releasably and/or penetrably received and concealed by the support structure to provide an integrated appearance, and which may optionally include adjustable irrigation systems configured to controllably supply water to the planter, structure and/or surrounding terrain.

BACKGROUND

Standard planter containers are normally secondary landscaping and aesthetic items used to beautify surroundings by decorating on or around a primary structure independent of the planter containers themselves. In the retail market, with few exceptions, such as a sitting planter, a stand, or stacked planters, planter placement and locations depend on attachment to these fixed structures with a cadre of separate independent devices, both individually or in combinations as brackets, hooks, clips, wires, chains, ropes, twine, macramé, holders, snaps, nails, screws, fittings for pipe and irrigation etc. Unfortunately, the attachment means are often quite visible, unappealing, unreliable and cumbersome. Improved means for attachment are needed.

While some new attachment devices continue to enter the market adding novelty, major changes and directions in developing more commercially viable retail planter container's are seemingly absent. Conventional attachment devices creating and supporting the planter container's use tend to limit their flexibility and growth. Conventional attachment devices are effective for connecting a planter to a support structure or entity. However, a more aesthetically pleasing, reliable and easy to use means of attachment is needed.

The types of conventional planters are myriad. While many are aesthetically pleasing, they suffer several shortcomings. One example of an existing type is decorative planters that can rest on a fixed structure as a floor, ground, ledge, rail or stand. They come in many attractive designs, sizes and colors and can be made of a variety of materials. New designs, sizes, patterns, colors and materials occasionally surface. However, they are limited to use with a planter that rests on a support surface.

Another type of conventional planter is the utilitarian nursery planter—usually thin walled black plastic units of a variety of sizes including trays. The trays feature a variety of shapes, sizes and designs to hold a variety of planter pots. Some hold the plant seedlings themselves for market distribution and planting. This type is typically a non-decorative functional planter for nursery, growing, distribution, transplanting and the like. New innovations are usually limited to improved handling, growth and rooting features prior to distribution. Improved integration and attachment means are needed for decorative use of such planters.

Another type of planter is the decorative hanging baskets. They include many designs and materials created specifically to hang with attachment devices, such as wire, rope or chain. Additionally, a variety of attachment devices previously referred to allows almost all planters to be hung. They come in many attractive designs, sizes and colors and can be made of a variety of materials. They all are very popular and easy to find for purchase. While conventional hanging devices are effective for attaching hanging planters to a support structure, a more aesthetically pleasing, less-conspicuous, reliable and easy to use means of attachment is needed.

Pole planters are yet another type of decorative planter. They are specialized products that are hard to find at retail outlets. They usually include a main structural supporting pole with appendages to support, hold or fix planters in place. Some are meant to look like trees or shrubs providing a heavy and large concentration of flowers or plants in an area. Many pole planters include a metal or plastic support rod driven into the ground by foot force and pressure. They often fall due to planter weight and or wind. A more aesthetically pleasing, less-conspicuous, reliable and easy to use means of releasable attachment is needed.

Plant stands are another type of planter. They often feature a unique appearance by using standard or specialized decorative planter containers. They typically use separate sitting or resting planters. A more aesthetically pleasing, less-conspicuous, reliable and easy to use means of releasable attachment is needed.

Another type of planter is modular planters that stack vertically in columns. They comprise a plurality of planters usually like, similar or identical in color, material, shape and form. Some use a pole passing through the middle of each planter to connect the planters. They usually are modular in design with matching features allowing each to fit into the previous unit stacked below it. They provide a display focal point suitable for featuring variety of plants, and flowers with contrasting colors and foliage in a fixed area. They are not very popular and difficult to find at major retail outlets. A more aesthetically pleasing, less-conspicuous, reliable and easy to use means of releasable attachment is needed.

Another shortcoming of conventional planters is limited locations. Planter locations are limited to available open areas for visibility at low levels or available structural supports or physical entities and the corresponding mounting hardware for attachment at higher levels. Thus, conventional planters as decorative devices may be displayed in limited locations due to the requirements of an appropriate accessible support structure.

Another shortcoming of conventional planters is their ability to blend or integrate into their surroundings or support structures, making their contents seem more like a part of the environment.

Another shortcoming of conventional planters is the inability to easily remove the planter when a conventional attachment device is used for fixing the planter to a structure.

Another shortcoming of conventional planters is limited use on pole structures, such as poles used for lighting, fences, irrigation and decoration. Conventional planters are limited by the available structures and the mounting hardware for attachment of planter containers.

Yet another shortcoming of conventional planters and categories is the lack of adjustable irrigation that can be configured to water the planter as well as the surrounding terrain.

Known prior art planters and categories that include irrigation systems are not adjustable and not configurable to surrounding terrain, rendering them of marginal utility for many plants and landscaping uses. A more versatile planting irrigation system is needed.

Conventional irrigation systems lack on aesthetically acceptable permanent high rise sprinkler. Sprinkling from a high point offers greater coverage advantage over fences, hedges, rock structures or mounds, bushes and even small trees. This often reduces the need for additional sprinkler heads, which can lead to a reduction in irrigation lines and valves etc. Ground level irrigation systems often tear into the more delicate flowers and ornamental plants as well as fail to go past this first tear of ornamentals deep into the landscaping beds again requiring more irrigation lines, sprinkler heads and water, all versus water, i.e., in essence "raining" down from above. Higher locations to irrigate from including fence poles offer the same advantages plus utilize unused recourses to improving our environment. There may even be some water savings in properly designed landscape and irrigation systems using the integrated planter systems with irrigation.

Conventional planters lack the ability to introduce, promote and assist in the use of water savings through micro irrigation systems.

Architects require innovative decorative planters for interiors and exteriors of buildings including lobbies of hotels, motels, condominiums, airports and commercial banks and offices. Conventional planters are often overlooked for a more innovative feature.

What is needed is a planter that integrates with a support structure primarily by releasable and penetrable engagement that is sufficient to support the planter without requiring conventional attachment devices, but may use conventional attachment devices to bolster the support. The engaging portions of the planters should be releasably and penetrably received and concealed by the support structure to provide an integrated appearance. The planters and support structures should integrate, making the support structures as planters too. The planters should optionally include adjustable irrigation systems configured to controllably supply water to the planter and/or surrounding terrain. The invention is directed to overcoming one or more of the problems and solving one or more of the needs as set forth above.

SUMMARY OF THE INVENTION

To solve one or more of the problems set forth above, in an exemplary implementation of the invention, planter systems comprising planters releasably integrated with a support structure primarily by releasable and penetrable engagement that is sufficient to support the planter without requiring conventional attachment devices are provided. Engaging portions of the planters are releasably and penetrably received and concealed by the support structure to provide an integrated appearance. The planter systems may optionally include adjustable irrigation systems configured to controllably supply water to the planter and/or surrounding terrain.

In one aspect of the invention, an exemplary planter assembly may include a planter configured for releasable integration with a support structure. The planter includes an external portion and an engaged portion, the support structure including a cavity shaped and sized to receive and securely and releasably engage the engaged portion of the planter. The engaged portion is shaped and sized to be received and securely, supportively and releasably engaged in the cavity of the support structure. The external portion extends from the engaged portion and outside the cavity and defines a compartment for holding a plant. The support structure has a mounting side. The cavity is formed in the mounting side of the support structure and comprises a slot with a slot entrance and a slot terminal end. The slot is angled with the terminal end vertically lower than the entrance. The engaged portion of the planter is an engagement tab shaped, oriented and sized to be received and securely and releasably engaged in the slot. The planter includes a support surface disposed between the engaged portion and external portion. The support surface is configured to abut the mounting side and having a shape that conforms to the shape of the mounting side of the support structure.

In another aspect of the invention, the support structure may be hollow and have a mounting surface. A cavity is formed in the mounting surface of the support structure. The cavity comprises a cutout formed in the mounting surface. The cutout includes parallel longitudinal upper slots having an upper length, parallel longitudinal lower slots having a lower length. A base opening has a height and width. The planter has a height and a diameter. The height of the planter is greater than the height of the base, but less than the sum of the height of the base plus the upper length plus the lower length. The diameter of the planter is greater than the width of the base opening. The cutout has a contour that conforms to the top contour of the planter.

In another aspect of the invention, the engaged portion of the planter includes a mounting flange. The support structure is hollow and has a mounting surface and the cavity is formed in the mounting surface of the support structure. The cavity comprises an aperture formed in the mounting surface of the cavity that is shaped, oriented and sized to receive and securely and releasably engage the mounting flange.

In yet another aspect of the invention, the engaged portion of the planter includes a perforated cup. The support structure is hollow and having a mounting surface and the cavity is formed in the mounting surface of the support structure. The cavity comprises an aperture formed in the mounting surface of the cavity. The aperture is shaped, oriented and sized to receive and securely and releasably engage the perforated cup. The cup is configured for selective placement in a corresponding nursery tray and the cavity.

In yet another aspect of the invention, a sprinkler and/or a microirrigation system may be provided to irrigate the planters and/or surrounding terrain.

In yet another aspect of the invention, the planter includes an planting portion and an engaged portion. The support structure includes a mating element shaped and sized to securely and releasably engage the engaged portion of the planter. The engaged portion is shaped and sized to securely, supportively and releasably engaged the mating element of the support structure. The planting portion extends from the engaged portion and defining an open compartment for holding a plant. The engaged portion may include a female receptacle configured to securely and releasably engage a male mating element of the support structure. Alternatively, the mating element may include a female receptacle configured to securely and releasably engage a male portion of the planter.

In another aspect of the invention, an irrigation subsystem is provided to water plants contained in the planters and/or surrounding terrain, and the subsystem includes a sprinkler, a microirrigation muffler, a microirrigation emitter, a constant flow valve, a variable flow valve, a misting device, and/or a nozzle.

In another aspect of the invention, a structural support is configured for releasable integration with a planter. The structural support includes an external portion and an engaged portion. The planter includes a cavity shaped and sized to receive and securely and releasably engage the engaged portion of said structural support. The engaged portion of the structural support is shaped and sized to be received and securely, supportively and releasably engaged in its cavity by the planter. The external portion extends from the engaged portion and outside the cavity. The external portion may define a compartment configured to hold a planter. In the alternative, the external portion may releasably engage (i.e., integrated with) the planter.

An assembly comprising a planter configured for releasable integration with a support structure according to principles of the invention may include any of a variety of irrigation devices, such as an impact sprinkler, a rotary sprinkler, a pop-up sprinkler, a microirrigation sprinkler, a misting device and any other water delivery means suitable for use with planters and/or surrounding terrain.

In another aspect of an exemplary embodiment of the invention, an irrigation assembly includes a structural support configured for releasable integration with a supported object. The supported object includes an external portion and an engaged portion. The structural support has a cavity shaped and sized to receive and securely and releasably engage the engaged portion of the structural support. The engaged portion of the structural support is shaped and sized to be received and securely, supportively and releasably engaged in its cavity by the supported object. The external portion extends from the engaged portion and outside the cavity. At least one irrigation device is also included, such as an impact sprinkler, a rotary sprinkler, a pop-up sprinkler, a microirrigation sprinkler and a misting device, said at least one irrigation device being configured to irrigate the surrounding terrain. The supported object may be a birdbath, a planter, a lighting assembly or a bird house.

In another aspect of an exemplary embodiment of the invention, an irrigation assembly is enclosed in an extruded fence pole for irrigation of the surrounding area with retainers for insert panels matching the fence section materials and optionally featuring any of the other embodiments which can be used on or with such a sufficient structure for releasably integrated planter containers.

In another aspect of an exemplary embodiment of the invention, a planter assembly comprises a structural support configured for containing a growing medium. The structural support includes a plurality of planter apertures. Each aperture is configured to allow a plant to grow in the medium contained in the support structure, said planter assembly further comprising an irrigation system. The irrigation system includes at least one irrigation device from the group consisting of an impact sprinkler, a rotary sprinkler, a pop-up sprinkler, a microirrigation sprinkler and a misting device. The irrigation system is configured to irrigate the medium and surrounding terrain.

BRIEF DESCRIPTION OF THE DRAWINGS

The foregoing and other aspects, objects, features and advantages of the invention will become better understood with reference to the following description, appended claims, and accompanying drawings, where:

FIG. 2 shows a front plan view of an exemplary planter assembly releasably integrated with a support structure primarily by releasable and penetrable engagement that is sufficient to support the planter without requiring conventional attachment devices according to principles of the invention; and FIG. 3 shows a top plan view of an exemplary planter assembly releasably integrated with a support structure primarily by releasable and penetrable engagement that is sufficient to support the planter without requiring conventional attachment devices according to principles of the invention; and FIG. 4 shows a perspective view of an exemplary planter for releasable integration with a support structure primarily by releasable and penetrable engagement that is sufficient to support the planter without requiring conventional attachment devices according to principles of the invention; and FIG. 5 shows a perspective view of an exemplary planter assembly releasably integrated with a support structure primarily by releasable and penetrable engagement that is sufficient to support the planter without requiring conventional attachment devices according to principles of the invention; and FIG. 6 shows a top plan view of an exemplary planter assembly releasably integrated with a support structure primarily by releasable and penetrable engagement that is sufficient to support the planter without requiring conventional attachment devices according to principles of the invention; and FIG. 7 shows a perspective view of an exemplary planter for releasable integration with a support structure primarily by releasable and penetrable engagement that is sufficient to support the planter without requiring conventional attachment devices according to principles of the invention; and FIG. 8 shows a front plan view of an exemplary planter assembly releasably integrated with a support structure primarily by releasable and penetrable engagement that is sufficient to support the planter without requiring conventional attachment devices according to principles of the invention; and FIG. 9 shows a front plan view of a portion of an exemplary planter assembly releasably integrated with a support structure primarily by releasable and penetrable engagement that is sufficient to support the planter without requiring conventional attachment devices according to principles of the invention; and FIG. 10 shows a perspective view of an exemplary planter for releasable integration with a support structure primarily by releasable and penetrable engagement that is sufficient to support the planter without requiring conventional attachment devices according to principles of the invention; and FIG. 11 shows a top plan view of an exemplary planter assembly releasably integrated with a support structure primarily by releasable and penetrable engagement that is sufficient to support the planter without requiring conventional attachment devices according to principles of the invention; and FIG. 12 shows a front view of an exemplary planter assembly including planters that are releasably integrated with a support structure primarily by releasable and penetrable engagement that is sufficient to support the planters without requiring conventional attachment devices, according to principles of the invention; and FIG. 13 shows a front view of a portion of an exemplary planter assembly including planters releasably integrated with a support structure primarily by releasable and penetrable engagement that is sufficient to support the planters without requiring conventional attachment devices, according to principles of the invention; and FIG. 14 shows a top plan view of a portion of an exemplary planter for releasable integration with a support structure primarily by releasable and penetrable engagement that is sufficient to support the planter without requiring conventional attachment devices according to principles of the invention; FIG. 18 shows a front plan view of an exemplary planter assembly releasably integrated with a support structure primarily by releasable and penetrable engagement that is sufficient to support the planter without requiring conventional attachment devices according to principles of the invention; and FIG. 19 shows a front plan view of a portion of an exemplary planter for releasable integration with a support structure primarily by releasable and penetrable engagement that is sufficient to support the planter without requiring conventional attachment devices according to principles of the invention; and FIG. 20 shows a top plan view of a portion of an exemplary planter for releasable integration with a support structure primarily by releasable and penetrable engagement that is sufficient to support the planter without requiring conventional attachment devices according to principles of the invention; and FIG. 21 shows a front plan view of portion of an exemplary planter assembly releasably integrated with a support structure primarily by releasable and penetrable engagement that is sufficient to support the planter without requiring conventional attachment devices according to principles of the invention; and FIG. 22 shows a front plan view of a portion of an exemplary planter for releasable integration with a support structure primarily by releasable and penetrable engagement that is sufficient to support the planter without requiring conventional attachment devices according to principles of the invention; and FIG. 23 shows a top plan view of a portion of an exemplary planter for releasable integration with a support structure primarily by releasable and penetrable engagement that is sufficient to support the planter without requiring conventional attachment devices according to principles of the invention; and FIG. 24 shows a top plan view of a portion of an exemplary planter for releasable integration with a support structure primarily by releasable and penetrable engagement that is sufficient to support the planter without requiring conventional attachment devices according to principles of the invention; and FIG. 25 shows a front plan view of portion of an exemplary planter assembly releasably integrated with a support structure primarily by releasable and penetrable engagement that is sufficient to support the planter without requiring conventional attachment devices according to principles of the invention; and FIG. 26 shows a front view of components and a portion of an exemplary planter for releasable integration with a support structure primarily by releasable and penetrable engagement that is sufficient to support the planter without requiring conventional attachment devices according to principles of the invention; FIG. 29 shows a front plan view of a portion of an exemplary irrigation system for a planter assembly releasably integrated with a support structure primarily by releasable and penetrable engagement that is sufficient to support the planter without requiring conventional attachment devices according to principles of the invention; and FIG. 30 shows a front plan view of a portion of an exemplary irrigation system for a planter assembly releasably integrated with a support structure primarily by releasable and penetrable engagement that is sufficient to support the planter without requiring conventional attachment devices according to principles of the invention; and FIG. 31 shows a perspective view of components of an exemplary irrigation system for a planter assembly releasably integrated with a support structure primarily by releasable and penetrable engagement that is sufficient to support the planter without requiring conventional attachment devices according to principles of the invention; FIG. 42 shows a front plan view of an exemplary planter assembly releasably integrated with a support structure primarily by releasable and penetrable engagement that is sufficient to support the planter without requiring conventional attachment devices according to principles of the invention; and FIG. 43 shows a front plan view of a portion of an exemplary irrigation system for a planter assembly releasably integrated with a support structure primarily by releasable and penetrable engagement that is sufficient to support the planter without requiring conventional attachment devices according to principles of the invention; and FIG. 44 shows a front plan view of a portion of an exemplary irrigation system for a planter assembly releasably integrated with a support structure primarily by releasable and penetrable engagement that is sufficient to support the planter without requiring conventional attachment devices according to principles of the invention; FIG. 47 shows a perspective view of an exemplary planter assembly with a planter configured for releasable integration with a support structure primarily by releasable and penetrable engagement that is sufficient to support the planter without requiring conventional attachment devices according to principles of the invention; and FIG. 48 shows a top view of an exemplary planter for releasable integration with a support structure primarily by releasable and penetrable engagement that is sufficient to support the planter without requiring conventional attachment devices according to principles of the invention; and FIG. 49 shows a perspective exploded view of an exemplary planter assembly with a planter configured for releasable integration with a support structure primarily by releasable and penetrable engagement that is sufficient to support the planter without requiring conventional attachment devices according to principles of the invention; and FIG. 50 shows a perspective view of an exemplary planter assembly with a planter configured for releasable integration with a support structure primarily by releasable and penetrable engagement that is sufficient to support the planter without requiring conventional attachment devices according to principles of the invention; and FIG. 51 shows a top view of an exemplary planter assembly with a planter configured for releasable integration with a support structure primarily by releasable and penetrable engagement that is sufficient to support the planter without requiring conventional attachment devices according to principles of the invention; and FIG. 52 shows a perspective view of an exemplary planter assembly with a planter configured for releasable integration with a support structure primarily by releasable and penetrable engagement that is sufficient to support the planter without requiring conventional attachment devices according to principles of the invention; and FIG. 53 shows a perspective view of an exemplary planter assembly with a planter for releasable integration with a support structure primarily by releasable and penetrable engagement that is sufficient to support the planter without requiring conventional attachment devices according to principles of the invention; and FIG. 54 shows a perspective view of an exemplary planter assembly with a planter for releasable integration with a support structure primarily by releasable and penetrable engagement that is sufficient to support the planter without requiring conventional attachment devices according to principles of the invention; and FIG. 55 shows a perspective view of an exemplary planter assembly with a planter for releasable integration with a support structure primarily by releasable and penetrable engagement that is sufficient to support the planter without requiring conventional attachment devices according to principles of the invention; and FIG. 56 shows a perspective view of an exemplary planter assembly with a planter for releasable integration with a support structure primarily by releasable and penetrable engagement that is sufficient to support the planter without requiring conventional attachment devices according to principles of the invention; and FIG. 57 shows a front section view of an exemplary planter assembly with a planter for releasable integration with a support structure primarily by releasable and penetrable engagement that is sufficient to support the planter without requiring conventional attachment devices according to principles of the invention; and FIG. 58 shows a top view of a planter for releasable integration with a support structure primarily by releasable and penetrable engagement that is sufficient to support the planter without requiring conventional attachment devices according to principles of the invention; and FIG. 59 shows a perspective view of a components of an exemplary planter assembly according to principles of the invention; and FIG. 60 shows a perspective view of a pole (i.e., support structure) according to principles of the invention; and FIG. 61 shows a perspective view of an exemplary planter for releasable integration with a support structure primarily by releasable and penetrable engagement that is sufficient to support the planter without requiring conventional attachment devices according to principles of the invention; and FIG. 62 shows a perspective view of portion of a planter configured for releasable integration with a support structure primarily by releasable and penetrable engagement that is sufficient to support the planter without requiring conventional attachment devices according to principles of the invention; and FIG. 63 shows a perspective view of a top portion of an exemplary planter pole according to principles of the invention; and FIG. 64 shows a perspective view of an exemplary planter configured for releasable integration with a support structure primarily by releasable and penetrable engagement that is sufficient to support the planter without requiring conventional attachment devices according to principles of the invention; and FIG. 65 shows a perspective view of a top portion of an exemplary planter pole according to principles of the invention; and FIG. 66 shows a perspective view of a top portion of an exemplary planter pole according to principles of the invention; and FIG. 67 shows a perspective view of a bottom portion of an exemplary planter configured for releasable integration with a support structure primarily by releasable and penetrable engagement that is sufficient to support the planter without requiring conventional attachment devices according to principles of the invention; and FIG. 68 shows a perspective view of a top portion of an exemplary planter pole according to principles of the invention; FIG. 75 shows a front plan view of a portion of an exemplary light pole with an integrated planter assembly according to principles of the invention; and FIG. 76 shows a front section view of an exemplary integrated planter assembly according to principles of the invention; and FIG. 77 shows a perspective view of a half of an exemplary integrated planter assembly according to principles of the invention; and FIG. 78 shows a perspective view of two separated halves of an exemplary integrated planter assembly according to principles of the invention; and FIG. 79 shows a front plan view of a portion of an exemplary light pole with an integrated planter assembly according to principles of the invention; and FIG. 80 shows a front perspective view of an exemplary engagement collar of an integrated planter assembly according to principles of the invention; and FIG. 81 shows a perspective view of an exemplary integrated planter assembly according to principles of the invention; and FIG. 82 shows a front perspective view of an exemplary engagement collar of an integrated planter assembly according to principles of the invention; and FIG. 83 shows a perspective view of an exemplary integrated planter assembly according to principles of the invention; and FIG. 84 shows a front plan view of a portion of an exemplary light pole with an integrated planter assembly according to principles of the invention; and FIG. 85 shows a perspective view of two separated planter sections of an exemplary integrated planter assembly according to principles of the invention; and FIG. 86 shows a magnified front view of an exemplary engagement neck of an integrated planter assembly according to principles of the invention; and FIG. 87 shows a front plan view of an exemplary light pole section with an integrated planter assembly according to principles of the invention; and FIG. 88 shows a magnified side view of an exemplary engagement neck of an integrated planter assembly according to principles of the invention; and FIG. 89 shows a magnified side view of an exemplary engagement hook of an integrated planter assembly according to principles of the invention; and FIG. 90 shows a magnified section view of an exemplary threaded attachment for a collar of an engagement means for an integrated planter assembly according to principles of the invention.

FIG. 91 shows a side view cut away of an exemplary extruded fence pole with an irrigation assembly and inset panels to optionally include other embodiments according to the principles of the invention; and FIG. 92 shows a top view of an exemplary extruded fence pole with an irrigation assembly and insert panels to optionally include other embodiments according to the principles of the invention; and FIG. 93 shows a top view of an exemplary extruded fence pole according to the principles of the invention; and FIG. 94 shows a top view of another exemplary extruded fence pole with an irrigation assembly and 4 inset panel spaces with wood fillers and structures for a corner post to optionally include other embodiments according to the principles of the invention; and FIG. 95 shows a top view of another exemplary extruded fence pole with an irrigation assembly and 2 insert panel spaces with wood fillers and structures for a corner post to optionally include other embodiments according to the principles of the invention; and FIG. 96 shows a top view of another exemplary extruded fence pole with an irrigation assembly and 3 insert panel spaces with wood fillers and structures to optionally include other embodiments according to the principles of the invention; and FIG. 97 shows a top view of another exemplary extruded fence pole with an irrigation assembly, wood fillers and structures to optionally include other embodiments, according to the principles of the invention.

DETAILED DESCRIPTION

Figure 1:
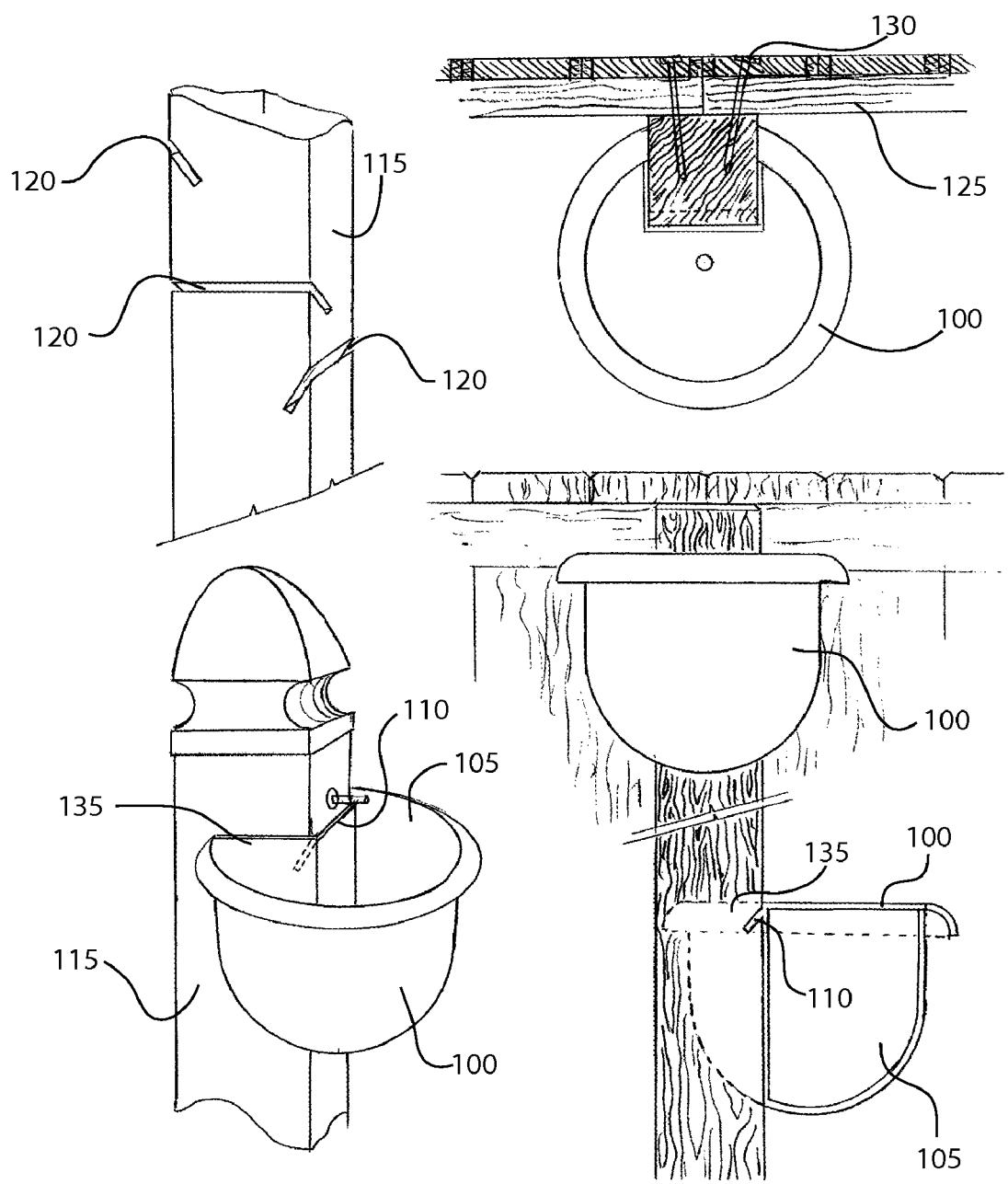
FIG. 1 is a perspective view of an exemplary planter assembly releasably integrated with a support structure primarily by releasable and penetrable engagement that is sufficient to support the planter without requiring conventional attachment devices according to principles of the invention.

Referring to the Figures, in which like parts are indicated with the same reference numerals, various views of exemplary planter assemblies in accordance with principles of the invention are conceptually illustrated. First referring to FIG. 1, an exemplary planter assembly includes a planter 100 configured for releasable integration with a support structure 115. The support structure 115 may be a fence post used to also support a fence section 125 using nails 130 or other attachment devices. The planter 100 includes an external planting portion 105 and an engaged portion 110 which is engaged by the support structure 115. The support structure 115 includes an open cavity 120 shaped and sized to receive and securely and releasably engage the engaged portion 110 of the planter. The engaged portion 110 is shaped and sized to be received and securely, supportively and releasably engaged in a cavity 120 of the support structure 115. The external portion 105 extends from the engaged portion 110 and outside the cavity 120 and defines an open compartment or receptacle for holding a plant.

Significantly, the planter 100 is releasably supported, meaning it can be readily removed without undoing any attachment bonds, clamps, screws, bolts or similar devices. Concomitantly, the planter 100 does not require any such attachments to be securely engaged by the support structure 115.

A support structure 115 may include a plurality of cavities 120 to support a plurality of planters 100. In such case, the plurality of cavities 120, are positioned to avoid obstruction by adjacent planters 100.

The support structure 115, which has mounting sides with a cavity 120 formed in each mounting side of the support structure. Each cavity 120 is shaped and sized to receive and securely and releasably engage an engaged portion 110 of the planter. The engaged portion 110 is shaped and sized to be received and securely, supportively and releasably engaged in the cavity 120 of the support structure. The external portion 105 of the planter 100 extends from the engaged portion 110 and outside the cavity 120, defining an open compartment for holding a plant.

In one aspect of an exemplary embodiment of the invention, as shown in FIGS. 1 through 5, the cavity is a slot 120, 210, 515 formed in the mounting side of the cavity. The slot may have a rectangular cross section 120, curved cross section 210, triangular cross section 515 or some other shape. The slot includes a slot entrance, i.e., opening, and a slot terminal end, i.e., back wall. In each case, the slot 120, 210, 515 is angled with the terminal end being vertically lower than the entrance. The engaged portion 110, 240, 545 of the planter 100, 230, 540 is thus a rectangular 110, curved 240, or angled 545 engagement tab shaped, oriented and sized to be received and securely and releasably engaged in the slot 120, 210, 515.

The support structures may feature various cross sectional shapes and configurations. By way of example, in FIG. 1 a rectangular (i.e., square) fence post 115 is depicted as a support structure, while FIG. 2 depicts a circular post 250 and FIG. 5 shows a rectangular (i.e., square) standalone post 505.

The support structures may be configured to support one or more planters, such as, for example, planters 100 and 105, as shown in FIG. 1, or planters 215, 220 and 230 as shown in FIG. 2, or planters 510, 530 and 540 as shown in FIG. 5. Thus, the support structures may include one or more slots 120, 210, 515 configured to engage one or more planters. Additionally, the support structures may be configured with various types of slots configured to support various style planters, with various engaged portions 110, 240, 545.

In another aspect of an exemplary embodiment of the invention, the planter includes a support surface disposed between the engaged portion and external portion. The support surface is configured to abut and conform to the mounting side of the support structure. The support structure and conforming support surface are not limited to any particular shape. By way of example, the support structure may be an elongated structure with a rectangular cross section and the support surface may be a rectangular channel with open medial, top and bottom ends. As another example, the support structure may be an elongated structure with a square cross section, and the support surface may be a rectangular channel with open medial, top and bottom ends. As yet another example, the support structure may be elongated and have a circular cross section, and the support surface may be a curved channel, such as a semicircular channel, with open medial, top and bottom ends. As still another example, the support structure may have an elliptical cross section and the support surface may be a curved channel with open medial, top and bottom ends. In a further example, the support structure has a rectangular cross section and the support surface is a right angle channel with open medial, top and bottom ends. Thus, the support surface may conform to an angle or any other contour feature of the support structure. These and other shaped support structures and conforming support surfaces are possible and come within the scope of the invention.

Referring to FIGS. 2 and 4, an exemplary planter assembly 200 and planter 235 configured for releasable integration with a support structure 250 primarily by releasable and penetrable engagement that is sufficient to support planters 215, 220, 230 without requiring conventional attachment devices are shown. A functional accessory, namely a birdhouse 205, is mounted atop the support structure 250. Three planters 215, 220, 230 are shown mounted to the support structure 250, which is a circular cross section pole 250, as illustrated in FIG. 3. One planter 235 is shown removed from a slot 210, 225 to illustrate the engagement portion 240 configured to slide into a slot, such as unoccupied slot 210 or 225. The exemplary planters include a rim 255 defining the free edge of the planter receptacle 235. The exemplary planters, such as planter 235, also includes a curved support surface 245 configured to abut and conform to the shape of the engaged portion of the support structure 250. The abutment and conformity provide an integrated appearance. Thus, while a releasably engaged planter 230 appears to be an integrated appendage of the support structure 250, the planter 230 can be removed simply by slidably disengaging the engaged portion 240 from an engaging slot 210.

Referring to FIGS. 5 and 7, another exemplary planter assembly 500 and planter 540 configured for releasable integration with a support structure 505 primarily by releasable and penetrable engagement that is sufficient to support planters 510, 530, 540 without requiring conventional attachment devices are shown. Three planters 510, 530, 540 are shown mounted to the support structure 505, which is a rectangular (e.g., square) cross section pole 505 as illustrated in FIG. 6. One planter 540 is shown removed from a slot 515 to illustrate the engagement portion 545 configured to slide into a slot, such as unoccupied slot 515. The exemplary planters include a rim 550 defining the free edge of the planter receptacle 540. The exemplary planters, such as planter 540, also includes an angled support surface 535 configured to abut and conform to the shape of the engaged portion (e.g., an engaged corner) of the support structure 505. The abutment and conformity provide an integrated appearance. Thus, while a releasably engaged planter 510 appears to be an integrated appendage of or permanently mounted to the support structure 505, the planter 510 can be removed simply by slidably disengaging the engaged portion 545 from an engaging slot 515.

In another aspect of an exemplary embodiment of the invention, the planter is sized and shaped to tightly fit a cavity in the support structure. Illustratively, the support structure may be hollow and have a mounting surface. A cavity formed in the mounting surface of the support structure may feature a cutout with a top edge, a bottom edge, parallel longitudinal upper slots that each have an upper length, parallel longitudinal lower slots that each have a lower length, and a base opening that extends from the top edge to the bottom edge and has a height and width. The height of the planter is greater than the height of the base but less than the sum of the height of the base plus the upper length plus the lower length. The planter includes a top rim to be engaged by the parallel longitudinal upper slots and a lower rim to be engaged by the parallel longitudinal lower slots. The diameter of the planter is greater than the width of the base opening.

Illustratively, with reference to FIGS. 8 through 11, a planter 1000 and an exemplary planter assembly 800 releasably integrated with a support structure 805 primarily by releasable and penetrable engagement that is sufficient to support the planter without requiring conventional attachment devices according to principles of the invention is shown. Six planters 810, 820, 825, 835, 845 and 855 are shown mounted to the support structure 815, which is a circular cross section pole 815, as illustrated in FIG. 11. One planter 1000 is shown removed from a cavity 915 to illustrate the cavity 915 as well as the engagement portion 1020 of the planter 1000 configured to mate with the cavity 915. The exemplary planters include an upper rim with parallel upper longitudinal slots 1110, 1115 configured (i.e., positioned, spaced, shaped and sized) to align with and engage to parallel longitudinal slots 905 formed at the top edge of the cavity 915. The bottom of the planter 1000 includes a rim 1005 configured (i.e., positioned, shaped and sized) to align with and engage the parallel longitudinal slots 920 formed at the bottom edge of the cavity 915. The engagement portion 1020 of each exemplary planter 810, 820, 825, 835, 845 and 855, is configured to penetrate into the cavity 915 and abut and intersect the edges of the cavity 915 to provide an integrated appearance. Thus, while a releasably engaged planter 810, 820, 825, 835, 845 and 855 appears to be an integrated appendage of the support structure 805, the planter can be removed simply by lifting the planter to release the rim 1005 from the lower slots 920, and then lowering the planter to release the upper slots 1110, 1115 from the upper slots 905 of the cavity 915, thereby slidably disengaging the engaged portion 1020 from the cavity 915.

In sum, the support structure and planter are configured for secure releasable engagement. The cavity 915 formed in the mounting surface of the support structure 805 features a cutout with a top edge, a bottom edge, parallel longitudinal upper slots that each have an upper length $l_u$, parallel longitudinal lower slots that each have a lower length $l_l$, and a base opening that extends from the top edge to the bottom edge and has a height h and width w. The height of the planter 1000 is greater than the height h of the base but less than the sum of the height h of the base plus the upper length $l_u$ plus the lower length $l_l$. The planter includes a top rim with slots 1110, 1115 to be engaged by the parallel longitudinal upper slots 905 and a lower rim 1005 to be engaged by the parallel longitudinal lower slots 920. The diameter of the planter is greater than the width w of the base opening.

In another aspect of an exemplary embodiment of the invention, the planter is shaped to conform to the cavity, and vice versa. For example, the top and bottom edges of the cavity may each have a contour that conforms to the top and bottom surface contours of the planter, respectively. The planter may have a surface contour including a top contour, an intermediate contour and a bottom contour. In such case, the bottom edge of the cavity may have a bottom contour that conforms to the bottom contour of the planter, the top edge of the cavity has a top contour that conforms to the top contour of the planter, and the top edge of the cavity has a top contour that conforms to the top contour of the planter.

Illustratively, with reference to FIGS. 12 through 14, a planter assembly 1200 having planters 1210, 1220, 1225, 1230, 1235 and 1240 releasably integrated with a support structure 1260 primarily by releasable and penetrable engagement that is sufficient to support the planter without requiring conventional attachment devices according to principles of the invention is shown. Six releasably integrated planters 1210, 1220, 1225, 1230, 1235 and 1240 are shown mounted to the support structure 1260, which is a circular cross section pole 1260, as illustrated in FIG. 14. One planter 1225 is shown removed from a cavity 1305 to illustrate the cavity 1305 as well as the engagement portion 1325 of the planter 1225 configured to mate with the cavity 1305. A supportive and decorative base planter 1250 with a central passageway 1245 is also provided. The base planter 1250 and support structure 1260 are concentric. A decorative cap 1205 is mounted atop the support structure 1260. Irrigation supply lines 1255 lead into the support structure to supply water to sprinklers integrated with the assembly 1200 and configured to irrigate the planters 1210, 1220, 1225, 1230, 1235 and 1240 and/or surrounding terrain. Irrigation lines may also be brought in through the sides of the container 1250 with the pole 145 integrated into the container 1250 without ground embedment. A water fountain feature is also optional 1256. It passes down between the various planters to the base planter 1250, where it may be recycled back to the top. The exemplary planters 1210, 1220, 1225, 1230, 1235 and 1240 include an upper rim 1330 with a slot 1325 configured (i.e., positioned, spaced, shaped and sized) to align with and engage a conforming cutout 1305 behind a lip 1310 formed in the support structure 1260. A rim support 1315 (i.e., a concave slot), defining the bottom of the cutout 1305, releasably engages a rim 1320 at the bottom of the planter 1210, 1220, 1225, 1230, 1235 and 1240. Thus, the bottom of the planter 1210, 1220, 1225, 1230, 1235 and 1240 includes a rim 1320 configured (i.e., positioned, shaped and sized) to align with and engage the rim support 1315. The engagement portion 1325 of each exemplary planter 1210, 1220, 1225, 1230, 1235 and 1240, is configured to slide into the conforming cutout 1305 and provide room for upward movement of the planter to allow the rim 1320 to be maneuvered into the rim support 1315. While a releasably engaged planter 1210, 1220, 1225, 1230, 1235 and 1240 appears to be an integrated appendage of the support structure 1260, the planter can be removed simply by lifting the planter to release the rim 1320 from the rim support 1315, and then lowering the planter to release the engagement portion 1325 from the conforming cutout 1305, thereby slidably disengaging the engaged portion planter.

A planter according to principle of the invention may be a uniform surface of revolution, i.e., a surface that can be defined by rotating a plane figure around a straight line (i.e., the axis) that lies on the same plane. Alternatively, the planter may include a feature (e.g., an engagement tab or cutout) uniquely tailored for engagement by the support structure. Thus, in the former case, the planter may comprise a container with an opening and a peripheral surface defining the container. The engaged portion of the planter includes a portion of the peripheral surface. Alternatively, the planter may include a recessed surface engaged by the cavity of the support structure. As another example, the engaged portion of the planter may include a mounting tab or flange configured (i.e., shaped, oriented and sized) to fit the cavity, which is correspondingly shaped, oriented and sized to receive and securely and releasably engage the mounting flange.

Figure 15:
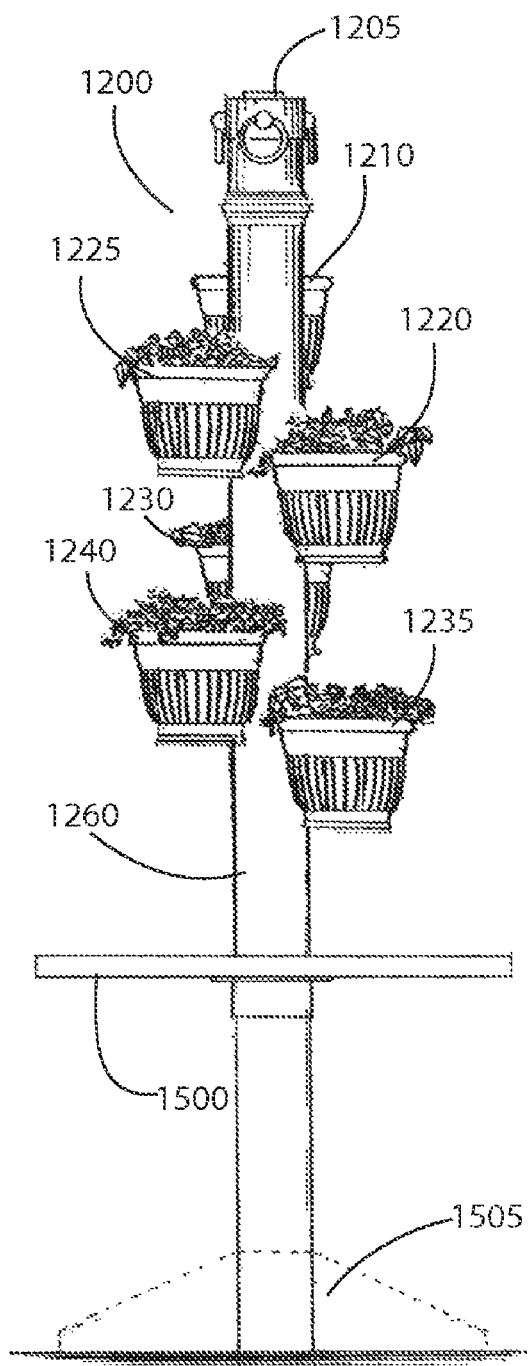
FIG. 15 shows a front plan view of an exemplary planter assembly releasably integrated with a support structure primarily by releasable and penetrable engagement that is sufficient to support the planter without requiring conventional attachment devices according to principles of the invention.
Figure 16:
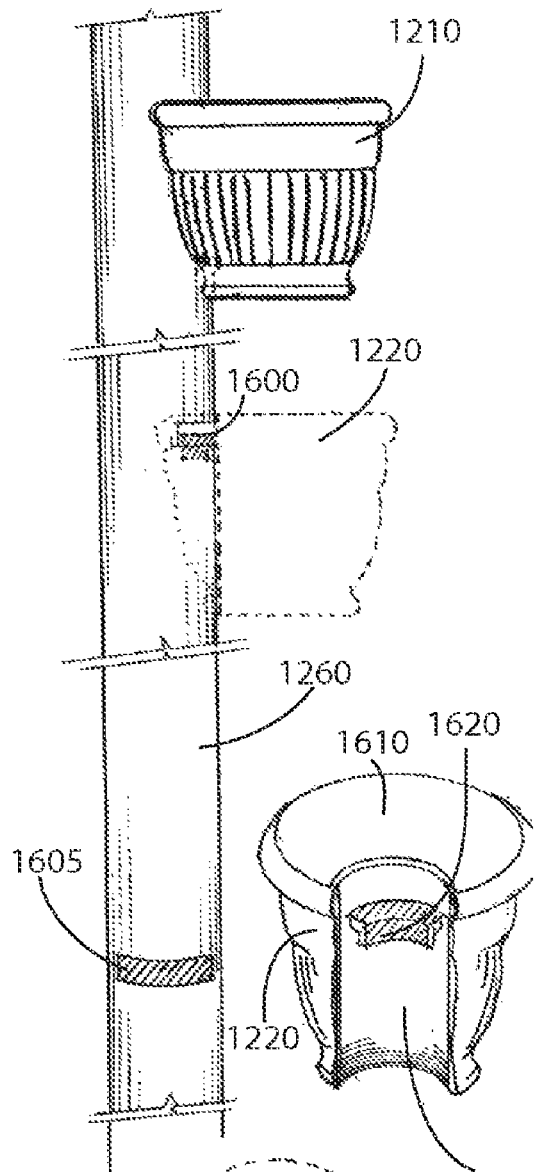
FIG. 16 shows a front plan view of a portion of an exemplary planter for releasable integration with a support structure primarily by releasable and penetrable engagement that is sufficient to support the planter without requiring conventional attachment devices according to principles of the invention.
Figure 17:
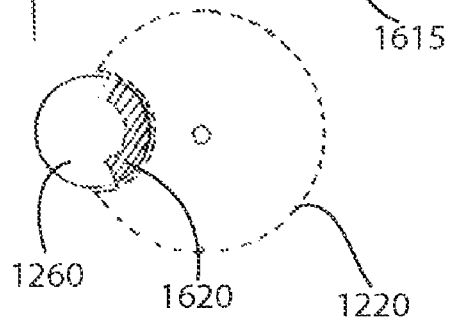
FIG. 17 shows a top plan view of a portion of an exemplary planter for releasable integration with a support structure primarily by releasable and penetrable engagement that is sufficient to support the planter without requiring conventional attachment devices according to principles of the invention.

Referring now to FIGS. 15, 16 and 17, another exemplary planter assembly 1200 with planters 1210, 1220, 1225, 1230, 1235 and 1240 configured for releasable integration with a support structure 1260 primarily by releasable and penetrable engagement that is sufficient to support planters 1210, 1220, 1225, 1230, 1235 and 1240 without requiring conventional attachment devices are shown. A functional accessory, namely a table 1500 and/or a support base 1505, are provided on the support structure 1260. Six planters 1210, 1220, 1225, 1230, 1235 and 1240 are shown releasably mounted to the support structure 1260, which is a circular cross section hollow pole 1260, as illustrated in FIG. 17. One planter 1220 is shown removed from a slot 1605 to illustrate the engagement portion 1620 (e.g., a hook-like, i.e., generally L or J-shaped hanging flange) configured to slide into a slot, such as unoccupied slot 1605. The exemplary planters, such as planter 1220, also includes a curved support surface 1615 configured to abut and conform to the shape of the engaged portion of the support structure 1260. The abutment and conformity provide an integrated appearance. Thus, while a releasably engaged planter 1210 appears to be an integrated appendage of the support structure 1260, the planter 1210 can be removed simply by lifting and slidably disengaging the engaged portion 1620 from an engaging slot 1605.

With reference to FIGS. 18 through 20, a planter assembly 1800 having planters 1815, 1820, 1825, 1830 and 1835 releasably integrated with a support structure 1840 primarily by releasable and penetrable engagement that is sufficient to support the planter without requiring conventional attachment devices according to principles of the invention is shown. Five releasably integrated planters 1815, 1820, 1825, 1830 and 1835 are shown mounted to the support structure 1840, which is a circular cross section pole 1840, as illustrated in FIG. 20. One planter 1825 is shown removed from a cavity 1945 to illustrate the cavity 1945 as well as the engagement portion 1955 of the planter 1825 configured to mate with the cavity 1945. A supportive base 1845 with a central passageway is optionally provided. A functional accessory, such as a light 1805, is mounted atop the support structure 1840. As discussed herein, functional accessories other than a lighting assembly may include a birdbath, a planter, or a bird house. Ornamental fixtures may also be used. The exemplary planters 1815, 1820, 1825, 1830 and 1835 include a lower rim 1965 configured (i.e., positioned, spaced, shaped and sized) to align with and engage slots 1940 in the cavity 1945 of the support structure 1840, an upper rim 1960 with a slot 1950 configured (i.e., positioned, spaced, shaped and sized) to align with and engage upper slots 1935 formed in the cavity 1945 of the support structure 1840. Thus, the bottom rim 1965 of the planter 1815, 1820, 1825, 1830 and 1835 is configured (i.e., positioned, shaped and sized) to align with and engage the lower rim support slots 1940. The engagement portion 1955 of each exemplary planter 1815, 1820, 1825, 1830 and 1835, is configured to slide into the conforming cutout 1945 and provide room for upward movement of the planter to allow the rim 1965 to be maneuvered into the rim support slots 1940. While a releasably engaged planter 1815, 1820, 1825, 1830 and 1835 appears to be an integrated appendage of the support structure 1840, the planter can be removed simply by lifting the planter to release the bottom rim 1965 from the rim support slots 1940, and then lowering the planter to release the engagement portion 1955 from the conforming cutout 1945, thereby slidably disengaging the engaged portion planter. A decorative top cap 1905 is provided, onto which a light 1805 may be mounted.

Referring now to FIGS. 21 and 22, another exemplary planter assembly 2100 with planters 2105, 2120 and 2130 configured for releasable integration with a support structure 2110 primarily by releasable and penetrable engagement that is sufficient to support planters 2105, 2120 and 2130 without requiring conventional attachment devices are shown. Two planters 2105 and 2120 are shown releasably mounted to the support structure 2110, which is a circular cross section hollow pole 2110, as illustrated in FIG. 22. One planter 2130 is shown removed from a slot 2125 to illustrate the engagement portion 2135 (e.g., a hook-like, i.e., generally L or J-shaped hanging flange with a circular face) configured to slide into a slot, such as unoccupied slot 2125. The slot can be enlarged at the bottom 2126 and the planter container further locked or integrated into position by lowering into the slot. Each planter includes an open cavity 2140 as a receptacle for plants. The exemplary planters, such as planter 2130, also includes a curved support surface 2145 configured to abut and conform to the shape of the engaged portion of the support structure 2110. The abutment and conformity provide an integrated appearance. Thus, while a releasably engaged planter 2130 appears to be an integrated appendage of the support structure 2110, the planter 2130 can be removed simply by lifting and slidably disengaging the engaged portion 2135 from an engaging slot 2125.

Referring now to FIGS. 23 and 24, another exemplary planter assembly 2200 with planters 2205, 2220 and 2230 configured for releasable integration with a support structure 2210 primarily by releasable and penetrable engagement that is sufficient to support planters 2205, 2220 and 2230 without requiring conventional attachment devices are shown. Two planters 2205 and 2220 are shown releasably mounted to the support structure 2210, which is a circular cross section hollow pole 2210, as illustrated in FIG. 24. One planter 2230 is shown removed from a slot 2225 to illustrate the engagement portion 2235 (e.g., a hook-like, i.e., generally L or J-shaped hanging flange with a triangular face) configured to slide into a slot, such as unoccupied triangular slot 2225. Each planter includes an open cavity 2240 as a receptacle for plants. The exemplary planters, such as planter 2230, also includes a curved support surface 2245 configured to abut and conform to the shape of the engaged portion of the support structure 2210. The abutment and conformity provide an integrated appearance. Thus, while a releasably engaged planter 2230 appears to be an integrated appendage of the support structure 2210, the planter 2230 can be removed simply by lifting and slidably disengaging the engaged portion 2235 from an engaging slot 2225.

Referring now to FIGS. 25 and 26, another exemplary planter assembly 2500 with planters 2510, 2515, 2520 and 2525 configured for releasable integration with a support structure 2530 primarily by releasable and penetrable engagement that is sufficient to support planters 2510, 2515, 2520 and 2525 without requiring conventional attachment devices are shown. Four planters 2510, 2515, 2520 and 2525 are shown releasably mounted to the support structure 2530, which is a circular cross section hollow pole 2530. One planter 2230 is shown removed from a slot 2225 to illustrate the engagement portion 2235 (e.g., a hook-like, i.e., generally L or J-shaped hanging flange with a triangular face) configured to slide into a slot, such as unoccupied triangular slot 2225. Functional accessories, including a light 2505 mounted atop the support structure 2530, and a brick support base 2535, are provided. Each planter includes an open cavity 2620 as a receptacle for plants. The exemplary planters, such as planter 2525, also includes a curved support surface 2625 configured to avoid electrical or plumbing components (e.g., pipes 2540, conduit and/or wires) in the center of the support structure 2530. An engaged portion 2610 of the planter includes a pair of slots 2630 configured to grip the side edges of the engagement cavity 2520. Thus, the planter 2525 is snap fit into the cavity 2520. While a releasably engaged planter 2510, 2515, 2520 and 2525 appears to be an integrated appendage of the support structure 2530, the planter 2510, 2515, 2520 and 2525 can be removed by deforming the engaged portion 2610 to release the engaged edges of the cavity 2520 from the engagement slots 2630, such as through squeezing, prying and pulling action.

A planter assembly according to the principles of the invention may include an irrigation subsystem. The irrigation subsystem includes a fluid conduit with an inlet and an outlet and a sprinkler fluidly coupled to the outlet and configured to irrigate the planter. The hollow support structure provides an interior compartment for housing and concealing components of the irrigation subsystem. Micro-irrigation valves and mufflers maybe utilized to supply low volume, low pressure water to plants. Conventional sprinklers and/or misters also be used to supply water to the planters and/or surrounding terrain. Indeed, any water delivery means suitable for use with assemblies and/or surrounding terrain in accordance with principles of the invention may be utilized and are intended to come within the scope of the invention.

Figure 27:
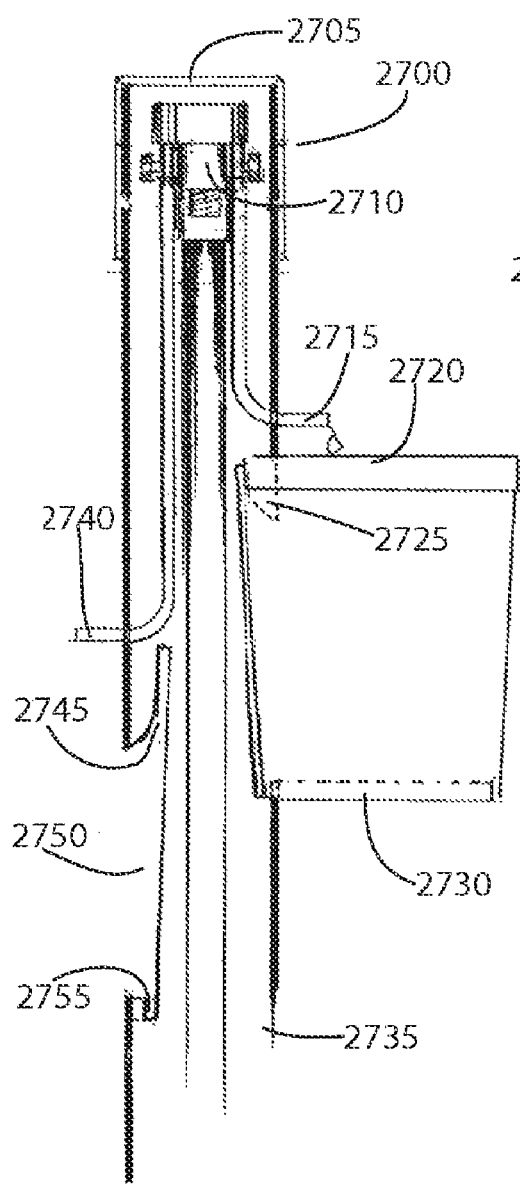
FIG. 27 shows a front plan view of portion of an exemplary irrigation system for a planter assembly releasably integrated with a support structure primarily by releasable and penetrable engagement that is sufficient to support the planter without requiring conventional attachment devices according to principles of the invention.

Referring now to FIG. 27, another exemplary planter assembly 2700 with an irrigation system 2710 and a planter 2720 configured for releasable integration with a support structure 2735 primarily by releasable and penetrable engagement that is sufficient to support the planter 2720 without requiring conventional attachment devices is shown. In a preferred embodiment, a microirrigation system is included. Also called trickle irrigation, bubblers and microsprinklers, a microirrigation system as contemplated herein broadly includes any localized irrigation system capable of providing water directly to a planter. In a preferred embodiment, the microirrigation system applies water to planters slowly and directly and at low pressure. The exemplary microirrigation system includes a manifold 2710 with a plurality of outlets (e.g., one outlet per planter). Hoses 2715, 2740 connected to the outlets direct water from the manifold 2710 to the planters 2730. The manifold may include pressure regulators, filters and valves to govern the supply of water through an outlet. Alternatively, if included, these components may be provided separately elsewhere in the irrigation system. The manifold may be placed at the top as shown, or in alternative locations inside or outside of the pole. The free (i.e., outlet) end of each hose 2715, 2740 leading to a planter 2720 may optionally terminate with any suitable emitting device, such as a spray head, dripper, misting system or nozzle. Misting systems can also irrigate the surrounding terrain. Optionally, the irrigation system may include a fertigation subsystem configured to controllably mix chemicals, such as liquid fertilizer, with the irrigation water. Advantageously, a microirrigation system helps achieve water conservation promote plant health by precisely applying water to planters with minimal overspray and soil disruption.

A releasably integrated planter 2720 is shown mounted to the support structure 2735, which is a hollow pole 2735. One cutout 2750 is shown without a planter to illustrate the cutout 2750. The exemplary planter 2720 includes an upper rim with a slot 2745 configured (i.e., positioned, spaced, shaped and sized) to align with and engage a conforming cutout behind a lip 2725 formed in the support structure 2735. A bottom rim support slot 2755, which defines the bottom of the cutout 2750, releasably engages a rim 2730 at the bottom of the planter 2720. The engaged portion of the planter 2720, is configured to slide into the corresponding cutout 2750 and provide room for upward movement of the planter to allow the bottom rim 2730 to be maneuvered into and out of the rim support slot 2755.

Those skilled in the art will appreciate that an irrigation system, such as the microirrigation system depicted in FIG. 27, is not limited to the planter assembly or releasable engagement means shown in FIG. 27. Rather, an irrigation system, such as the microirrigation system depicted in FIG. 27, may be utilized in connection with any planter assembly and releasable engagement means in accordance with principles of the invention.

Figure 28:
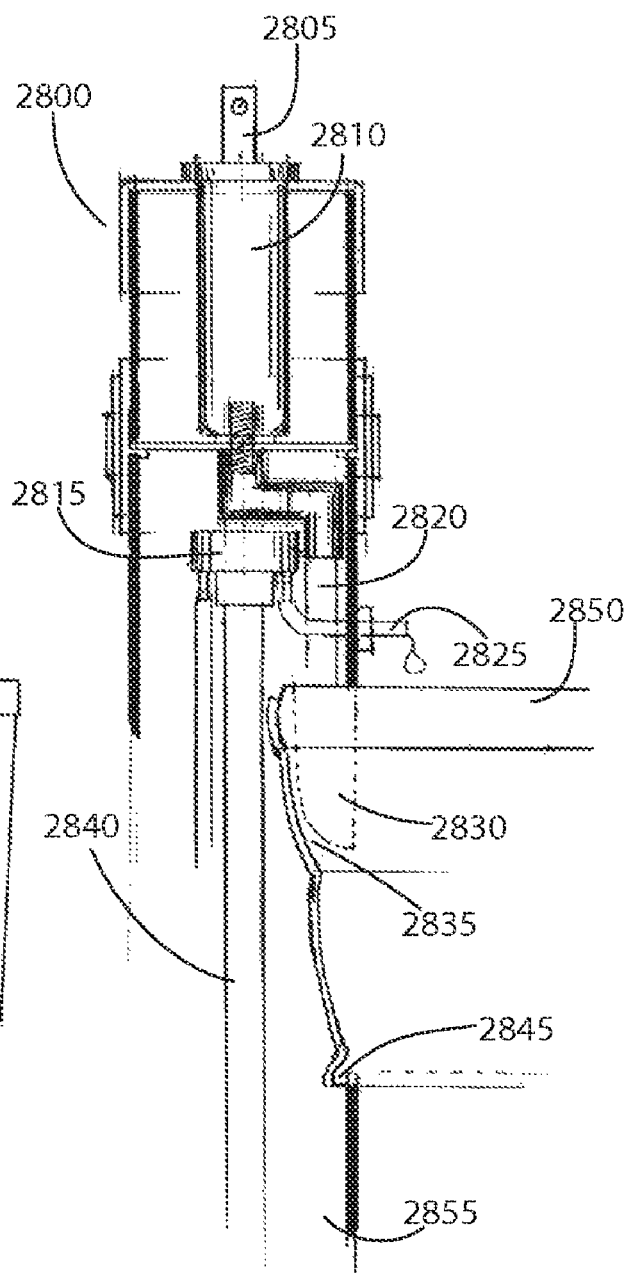
FIG. 28 shows a front plan view of a portion of an exemplary irrigation system for a planter assembly releasably integrated with a support structure primarily by releasable and penetrable engagement that is sufficient to support the planter without requiring conventional attachment devices according to principles of the invention.

Referring now to FIG. 28, another exemplary planter assembly 2800 with a irrigation system configured to water planters and surrounding terrain is shown. In a preferred embodiment, a sprinkler system 2810 with a pop-up rotary head 2805 and a microirrigation system 2815 are included. In a preferred embodiment, the sprinkler 2810 waters surrounding terrain and the microirrigation system 2815 applies water to planters slowly and directly and at low pressure. Alternative misting systems can also be used. The exemplary microirrigation system includes a manifold 2815 with a plurality of outlets (e.g., one outlet per planter). A hose 2825 connects to the outlet and directs water from the manifold 2815 to the planters 2850. The manifold 2815 may include pressure regulators, filters and valves to govern the supply of water through an outlet. Alternatively, if included, these components may be provided separately elsewhere in the irrigation system. The manifold may be placed at the top as shown or in alternative locations inside or outside of the pole. The free (i.e., outlet) end of the hose 2825, leading to the planter 2850 may optionally terminate with any suitable emitting device, such as a spray head, dripper, misting system or nozzle. Misting systems can also irrigate the surrounding area. Supply lines 2820 and 2840 supply water to the sprinkler 2810 and microirrigation 2815 systems, respectively. Optionally, each irrigation system may include a fertigation subsystem configured to controllably mix chemicals, such as liquid fertilizer, with the irrigation water.

A releasably integrated planter 2850 is shown mounted to the support structure 2855, which is a hollow pole 2855. The exemplary planter 2720 includes an upper rim with a slot configured (i.e., positioned, spaced, shaped and sized) to align with and engage a conforming cutout behind a lip 2830 formed in the support structure 2855. A bottom rim support slot 2845, which defines the bottom of the cutout 2835, releasably engages a rim at the bottom of the planter 2850. The engaged portion of the planter 2850, is configured to slide into the corresponding cutout 2835 and provide room for upward movement of the planter to allow the bottom rim to be maneuvered into and out of the rim support slot 2835.

Referring now to FIG. 29, another exemplary planter assembly 2900 with an cap 2905, an irrigation system 2910 and a planter 2920 configured for releasable integration with a support structure 2935 primarily by releasable and penetrable engagement that is sufficient to support the planter 2920 without requiring conventional attachment devices is shown. In a preferred embodiment, a microirrigation system is included. The exemplary microirrigation system includes a manifold 2910 with a plurality of outlets (e.g., one outlet per planter). Hoses 2915, 2940 connected to the outlets direct water from the manifold 2910 to the planters 2930. The manifold may include pressure regulators, filters and valves to govern the supply of water through an outlet. Alternatively, if included, these components may be provided separately elsewhere in the irrigation system. The free (i.e., outlet) end of each hose 2915, 2940 leading to a planter 2920 may optionally terminate with any suitable emitting device, such as a spray head, dripper, misting system or nozzle. Misting systems can also irrigate the surrounding area. A supply line 2965 supplies water to the manifold. Optionally, the irrigation system may include a fertigation subsystem configured to controllably mix chemicals, such as liquid fertilizer, with the irrigation water.

A releasably integrated planter 2920 is shown mounted to the support structure 2935, which is a hollow pole 2935. One cutout 2955 is shown without a planter to illustrate the cutout 2955. The exemplary planter 2920 includes an upper rim with a slot configured (i.e., positioned, spaced, shaped and sized) to align with and engage a conforming cutout behind a lip 2925 formed in the support structure 2935. A bottom rim support slot 2960, which defines the bottom of the cutout 2955, releasably engages a rim 2930 at the bottom of the planter 2920. The engaged portion of the planter 2920, is configured to slide into the corresponding cutout 2955 and provide room for upward movement of the planter to allow the bottom rim 2930 to be maneuvered into and out of the rim support slot 2960.

Those skilled in the art will appreciate that an irrigation system, such as the microirrigation system depicted in FIG. 29, is not limited to the planter assembly or releasable engagement means shown in FIG. 29. Rather, an irrigation system, such as the microirrigation system depicted in FIG. 29, may be utilized in connection with any planter assembly and releasable engagement means in accordance with principles of the invention.

Referring now to FIG. 30, another exemplary planter assembly 3000 with an irrigation system configured to water planters and surrounding terrain is shown. In a preferred embodiment, a sprinkler system 3010 with a pop-up rotating impact head 3005 and an integrated microirrigation system, as shown in FIG. 31, are included. In a preferred embodiment, the sprinkler 3010 waters surrounding terrain and the microirrigation system collects water dripped from the sprinkler 3010 applies water to planters slowly and directly and at low pressure. The dripped water is collected first in a cup 3110 with slots 3100 in the bottom, which can be oriented fully or partially in alignment with slots 3105 in an intermediate cup 3120, to control the rate of water flow. A lower cup 3125 includes a manifold with a plurality of outlets connected to hoses 3015, 3030, 3130. The hoses 3015, 3030, 3130 supplies water to planters 3045. The exemplary microirrigation system includes a manifold 3015 with a plurality of outlets (e.g., one outlet per planter). The free (i.e., outlet) end of the hose 3015, 3030, 3130, leading to the planter 3045 may optionally terminate with any suitable emitting device, such as a spray head, dripper, misting system or nozzle. Misting systems can also irrigate the surrounding area. Supply lines supply water to the sprinkler 3005. Optionally, the irrigation system may include a fertigation subsystem configured to controllably mix chemicals, such as liquid fertilizer, with the irrigation water.

A releasably integrated planter 3045 is shown mounted to the support structure 3035, which is a hollow pole 3035. The exemplary planter 3045 includes an upper rim with a slot configured (i.e., positioned, spaced, shaped and sized) to align with and engage a conforming cutout behind a lip 3020 formed in the support structure 3035. A bottom rim support slot 3025, which defines the bottom of the cutout 3020, releasably engages a rim at the bottom of the planter 3045. The engaged portion of the planter 3045, is configured to slide into the corresponding cutout 3020 and provide room for upward movement of the planter to allow the bottom rim to be maneuvered into and out of the rim support slot 3025.

Those skilled in the art will appreciate that an irrigation system, such as the combination sprinkler and microirrigation system depicted in FIG. 30, is not limited to the planter assembly or releasable engagement means shown in FIG. 30. Rather, an irrigation system, such as the combination sprinkler and microirrigation system depicted in FIG. 30, may be utilized in connection with any planter assembly and releasable engagement means in accordance with principles of the invention.

Figure 32:
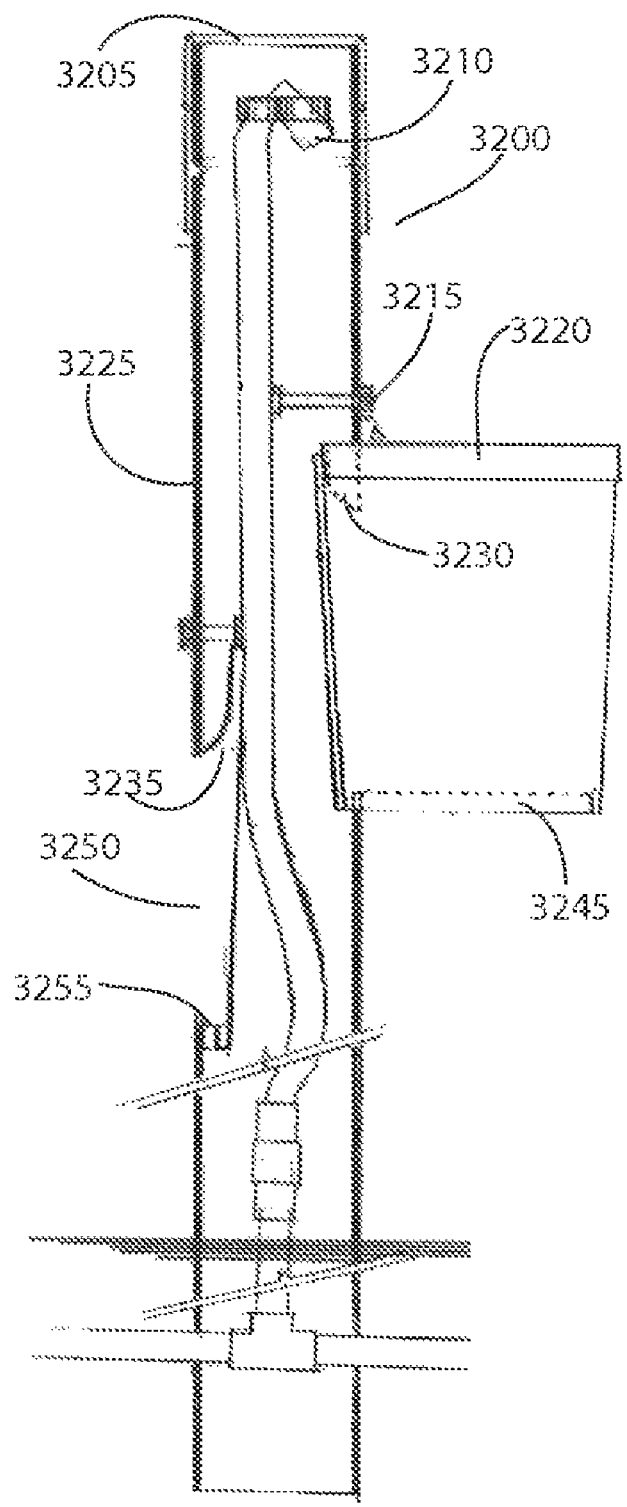
FIG. 32 shows a front plan view of a portion of an exemplary irrigation system for a planter assembly releasably integrated with a support structure primarily by releasable and penetrable engagement that is sufficient to support the planter without requiring conventional attachment devices according to principles of the invention.

Referring now to FIG. 32, another exemplary planter assembly 3200 with an irrigation system configured to water planters is shown. A top cap 3205 covers the top of the support structure 3225. In a preferred embodiment, an irrigation system 3210 with drip emitters 3215 is included. In a preferred embodiment, the irrigation system 3210 applies water to planters slowly and directly and at low pressure. The end of a supply line 3210 is clamped or otherwise closed. An emitter 3215 for each planter fluidly connects to the supply line 3210. The free (i.e., outlet) end of each emitter 3215 leads to the planter 3220, and may optionally terminate with any suitable emitting device, such as a spray head, dripper, misting system or nozzle. Misting systems can also irrigate the surrounding area. Optionally, the irrigation system may include a fertigation subsystem configured to controllably mix chemicals, such as liquid fertilizer, with the irrigation water.

A releasably integrated planter 3220 is shown mounted to the support structure 3225, which is a hollow pole 3225. The exemplary planter 3220 includes an upper rim with a slot configured (i.e., positioned, spaced, shaped and sized) to align with and engage a conforming cutout 3225 behind a lip 3230 formed in the support structure 3225. A bottom rim support slot 3255, which defines the bottom of the cutout 3250, releasably engages a rim at the bottom of the planter 3245. The engaged portion of the planter 3245, is configured to slide into the corresponding cutout 3250 and provide room for upward movement of the planter to allow the bottom rim to be maneuvered into and out of the rim support slot 3255.

Figure 33:
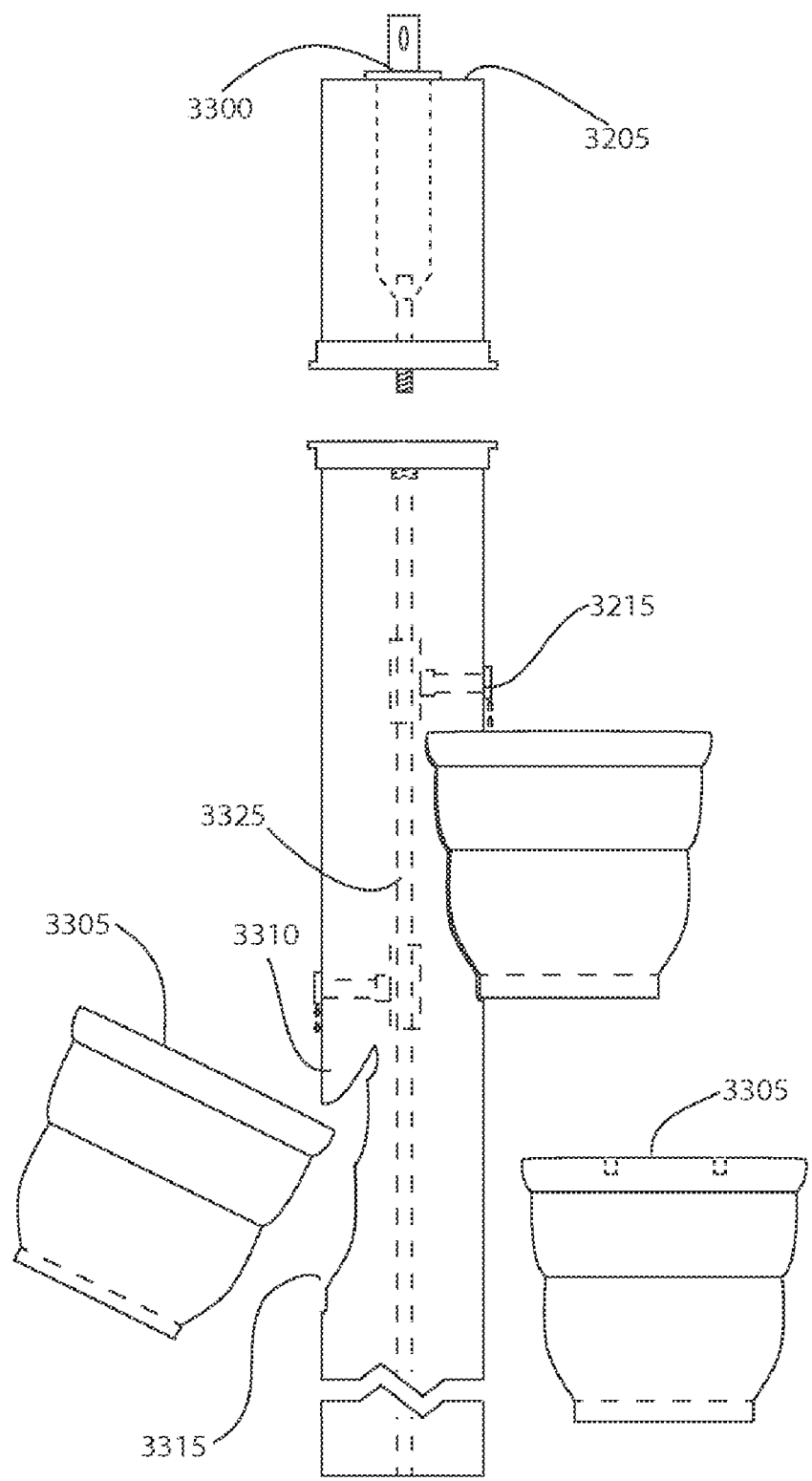
FIG. 33 shows a front plan view of a portion of an exemplary irrigation system for a planter assembly releasably integrated with a support structure primarily by releasable and penetrable engagement that is sufficient to support the planter without requiring conventional attachment devices according to principles of the invention.

Referring now to FIG. 33, another exemplary planter assembly with an irrigation system configured to water planters and surrounding terrain is shown. A top cap 3305 covers the top of the support structure. In a preferred embodiment, an irrigation system with a sprinkler 3300 and drip emitters 3215 fed by a water supply line 3325 is included. In a preferred embodiment, the sprinkler 3300 waters surrounding terrain while drip emitters 3215 apply water to planters slowly and directly and at low pressure. The free (i.e., outlet) end of each emitter 3215 leads to a planter 3305, and may optionally terminate with any suitable emitting device, such as a spray head, dripper, misting system or nozzle. Misting systems can also irrigate the surrounding area. Optionally, the irrigation system may include a fertigation subsystem configured to controllably mix chemicals, such as liquid fertilizer, with the irrigation water.

A releasably integrated planter 3305 is shown mounted to the support structure, which is a hollow pole. The exemplary planter 3305 includes an upper rim with a slot configured (i.e., positioned, spaced, shaped and sized) to align with and engage a conforming cutout behind a lip 3310 formed in the support structure. A bottom rim support slot 3315, which defines the bottom of the cutout, releasably engages a rim at the bottom of the planter 3320. The engaged portion of the planter 3305, is configured to slide into the corresponding cutout and provide room for upward movement of the planter to allow the bottom rim to be maneuvered into and out of the rim support slot 3315.

In another embodiment, the engaged portion of an exemplary planter includes a perforated cup. The support structure is hollow and has a mounting surface. An aperture formed in the mounting surface of the support structure is shaped, oriented and sized to receive and securely and releasably engage the perforated cup. The cup is configured for selective placement in a corresponding nursery tray and the cavity. The cavity may be a threaded aperture formed in the mounting surface of the cavity. In which case, the cup may include threads to threadedly engage the threaded aperture. The cavity may be pre-formed in the support structure during manufacturing or cut in the mounting surface of the support structure using a cutting tool during installation.

In another embodiment, the engaged portion of an exemplary planter includes a perforated cup. The support structure is hollow and has a mounting surface. An aperture formed in the mounting surface of the support structure is shaped, oriented and sized to receive and securely and releasably engage the perforated cup. The cup is configured for selective placement in a corresponding nursery tray and the cavity. The cavity may be a threaded aperture formed in the mounting surface of the cavity. In which case, the cup may include threads to threadedly engage the threaded aperture. The cavity may be pre-formed in the support structure during manufacturing or cut in the mounting surface of the support structure using a cutting tool during installation.

Figure 34:
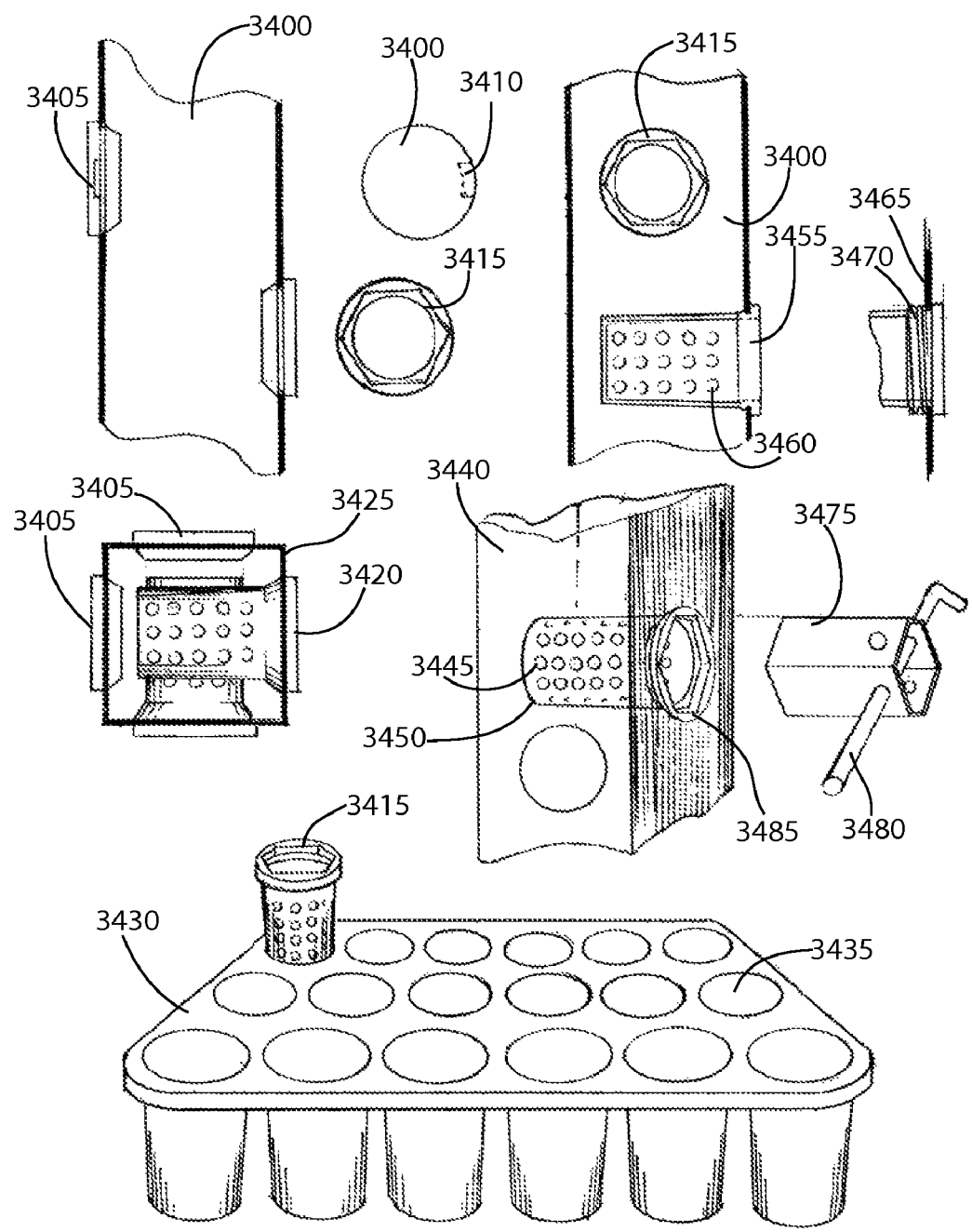
FIG. 34 shows various components of a planter assembly for releasable integration with a support structure primarily by releasable and penetrable engagement that is sufficient to support the planter without requiring conventional attachment devices according to principles of the invention.
Figure 35:
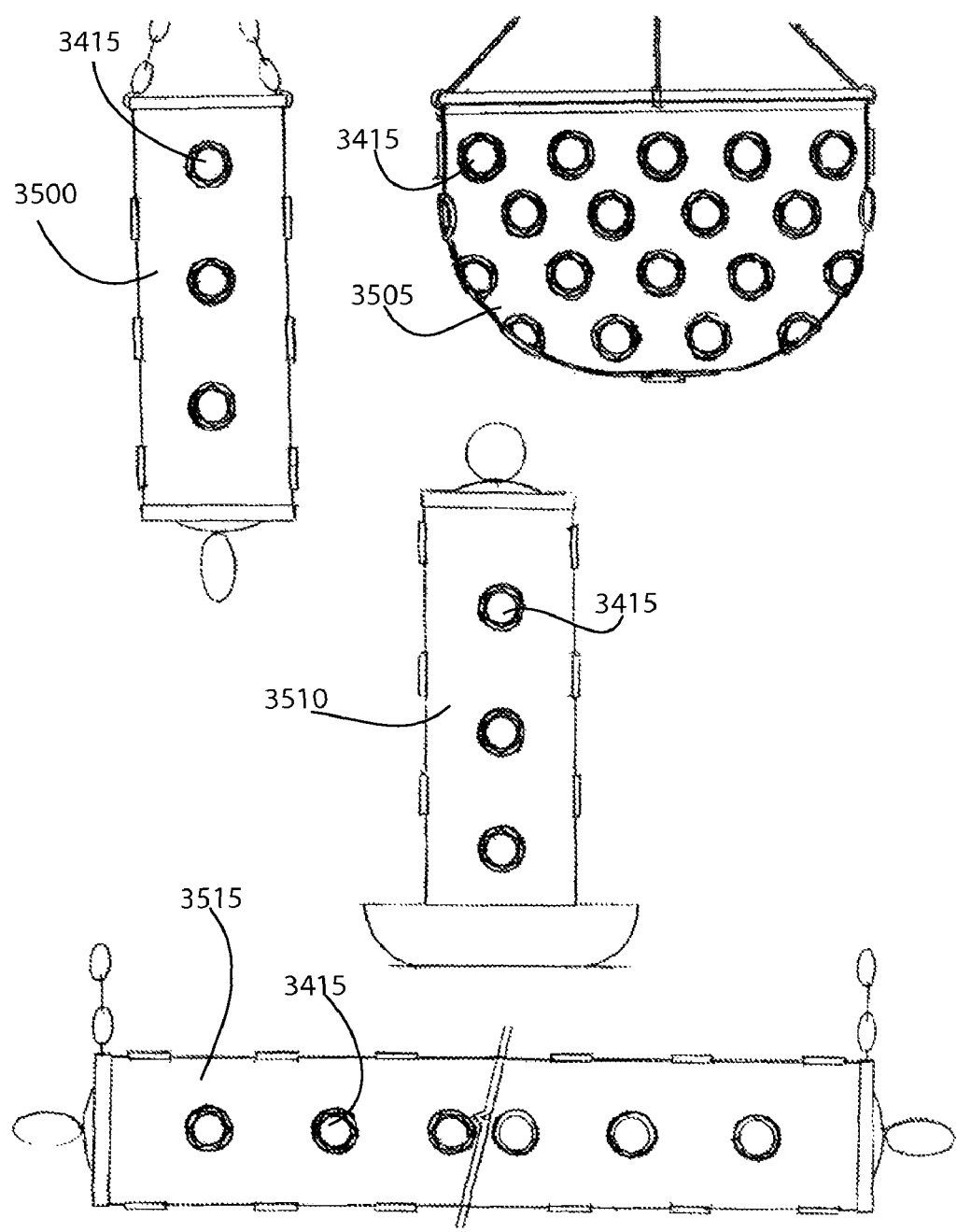
FIG. 35 shows a front plan view of exemplary support structures for a planter assembly releasably integrated with a support structure primarily by releasable and penetrable engagement that is sufficient to support the planter without requiring conventional attachment devices according to principles of the invention.

Referring now to FIG. 34, the support structure 3400, 3425, 3440 includes a cavity shaped and sized to securely and releasably engage an engaged portion of cup-like planters 3415. The cup-like planters in FIGS. 34, 35 and 36 may be of any material, size or shape and can further be hard, soft, permanent or throw-away, i.e., dispensable. The engaged portion 3415, 3420, 3455, 3470 of the planter 3425 is shaped and sized to securely, supportively and releasably engage the periphery 3465 of the cavity of the support structure. The planting portion 3450, which extends from the engaged portion, defines an open compartment for holding a plant. The engaged portion may include a collar 3420 and/or threads 370 configured to securely and releasably engage the peripheral edge of the cavity of the support structure. The engaged portion of the planter may be geometrically shaped 3485 for engagement by a socket 3475, with a gripping cross bar 3480. Collars and/or caps 3405 may be provided for cavities not occupied with cup-like planters 3415. The cup may be perforated 3445, 3460 to facilitate drainage and rooting. A tray 3430 with compartments 3435 may be provided to carry and store cup-like planters 3415. Similarly, cup-like planters 3415 and collars 3420 may be included in hanging support structures 3500, 3505, 3510, 3515, as shown in FIG. 35.

Figure 36:
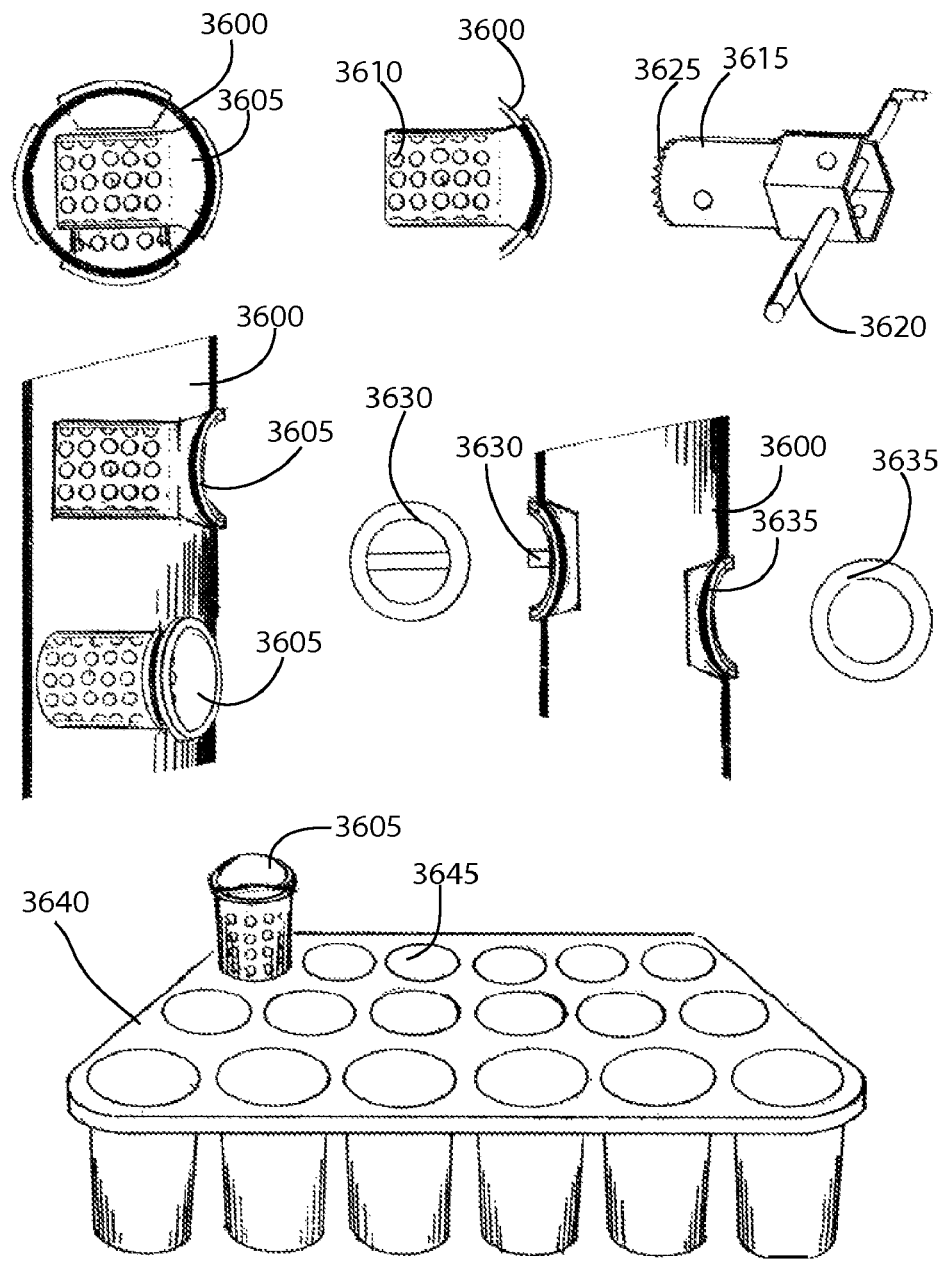
FIG. 36 shows various components of a planter assembly for releasable integration with a support structure primarily by releasable and penetrable engagement that is sufficient to support the planter without requiring conventional attachment devices according to principles of the invention.

In another embodiment cup-like planters 3605 with rims contoured to conform to the shape of a support structure 3600 are pressed into cavities formed in the support structure 3600, such as by cutting with a correspondingly shaped cutting tool 3615 or drill, as shown in FIG. 36. The cutting tool 3615 includes sharp cutting teeth 3625 and a cross bar 3620. The cutting tool may also be used for removal of growing medium and debris. Caps 3625 and collars 3635 may be inserted in cavities unoccupied by cup-like planters 3605. A tray 3430 with compartments 3435 may be provided to carry and store the cup-like planters 3605.

Figure 37:
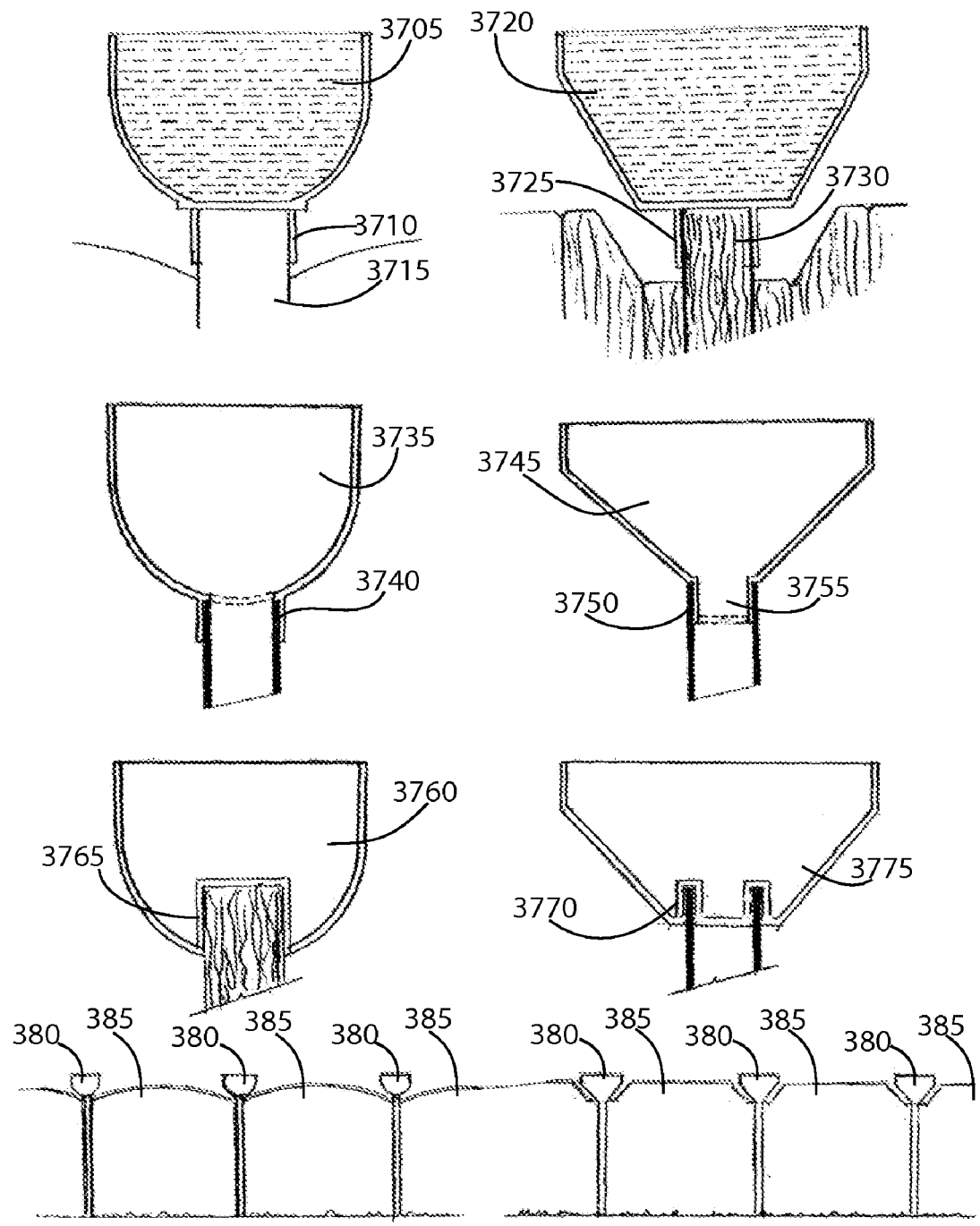
FIG. 37 shows a front plan view of exemplary support structures and top mounted planter assemblies releasably integrated with a support structure primarily by releasable and penetrable engagement that is sufficient to support the planter without requiring conventional attachment devices according to principles of the invention.
Figures 38, 39, 40, 41:
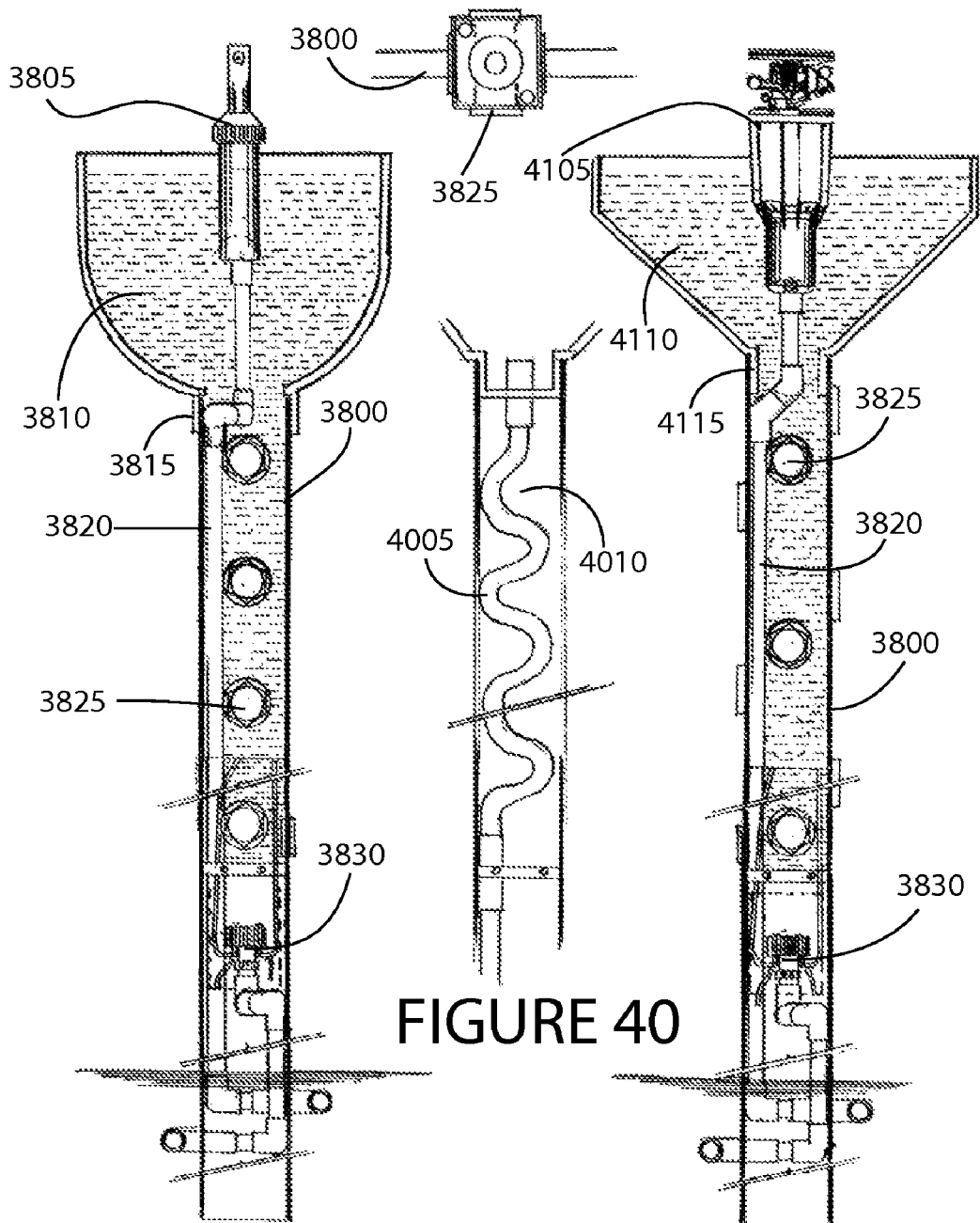
FIG. 38 shows a front plan view of an exemplary planter assembly releasably integrated with a support structure primarily by releasable and penetrable engagement that is sufficient to support the planter without requiring conventional attachment devices according to principles of the invention.
FIG. 39 shows a top plan view of a portion of an exemplary planter assembly releasably integrated with a support structure primarily by releasable and penetrable engagement that is sufficient to support the planter without requiring conventional attachment devices according to principles of the invention.
FIG. 40 shows a front plan view of a portion of an exemplary irrigation system for a planter assembly releasably integrated with a support structure primarily by releasable and penetrable engagement that is sufficient to support the planter without requiring conventional attachment devices according to principles of the invention.
FIG. 41 shows a front plan view of an exemplary planter assembly releasably integrated with a support structure primarily by releasable and penetrable engagement that is sufficient to support the planter without requiring conventional attachment devices according to principles of the invention.

In another embodiment, the engaged portion of an exemplary planter 3705, 3720, 3735, 3745, 3760 and 3775 includes a female receptacle 3710, 3725, 3740, 3765, 3770 or a male plug 3755 and the support structure includes a male plug 3715, 3730, 3740, 3765, or female receptacle 3750 to mate with the corresponding feature of the planter, as shown in FIG. 37. Illustratively, the support structures may comprise posts of a fence 385, with the planters 380 mounted atop the posts.

Referring now to FIGS. 38, 39, 40 and 41, a support structure 3800 includes cavities shaped and sized to securely and releasably engage an engaged portion of cup-like planters 3825. In a preferred embodiment, an irrigation system with a pop-up rotary sprinkler 3805 or impact sprinkler 4105, and microirrigation system 3830 fed by a water supply line are included. In a preferred embodiment, the sprinklers 3805, 4105 water the top planters 3810 and 4110 and surrounding terrain, while the microirrigation system applies water to the cup-like planters 3825 slowly and directly and at low pressure. The supply line may be curved 4005 to navigate around areas occupied by planters 4010. A top mounted planter 3810, 4110 includes a female receptacle 3815 or a male plug 4115 and the support structure includes a mating male plug or female receptacle. Misting systems can be alternatively used at any irrigation point in the system or added as necessary. In this example, the poles 3880, planters 3810 and 3410, and cup-like planter 3825 become a plurality of releasably integrated planter containers further integrated into one. The structural support 3880 includes a plurality of planter apertures, each of which is configured to allow a plant to grow in a medium, which may be contained in the support structure.

The assembly further includes an irrigation system. The irrigation system includes at least one irrigation device from the group consisting of an impact sprinkler, a rotary sprinkler, a pop-up sprinkler, a microirrigation sprinkler and a misting device. The irrigation system is configured to irrigate the medium and/or surrounding terrain.

Referring now to FIGS. 42, 43 and 44, a support structure 4205 includes cavities with planter collars 4210, 4215, and 4220 into which plants may be inserted. A support base 4225 may be provided. In one embodiment, the top cap 4430 is removed to accommodate a sprinkler of an irrigation system comprising a pop-up rotary or impact sprinkler 4405 and microirrigation system 4420 fed by a water supply line 4425 are included. In a preferred embodiment, the sprinkler 4405 waters the surrounding terrain, while the microirrigation system applies water to the plants occupying the collar surrounded cavities 4210, 4215, 4220, 4415. The supply line may be curved 4305 to navigate around areas occupied by plants. A coupling 4320 4325 may join the plumbing components. In this example, the pole with irrigation system becomes the planter container integrated with releasable snap-in rings or collars. Misting systems can be alternatively used at any irrigation point in the system or added as necessary.

Figures 45, 46:
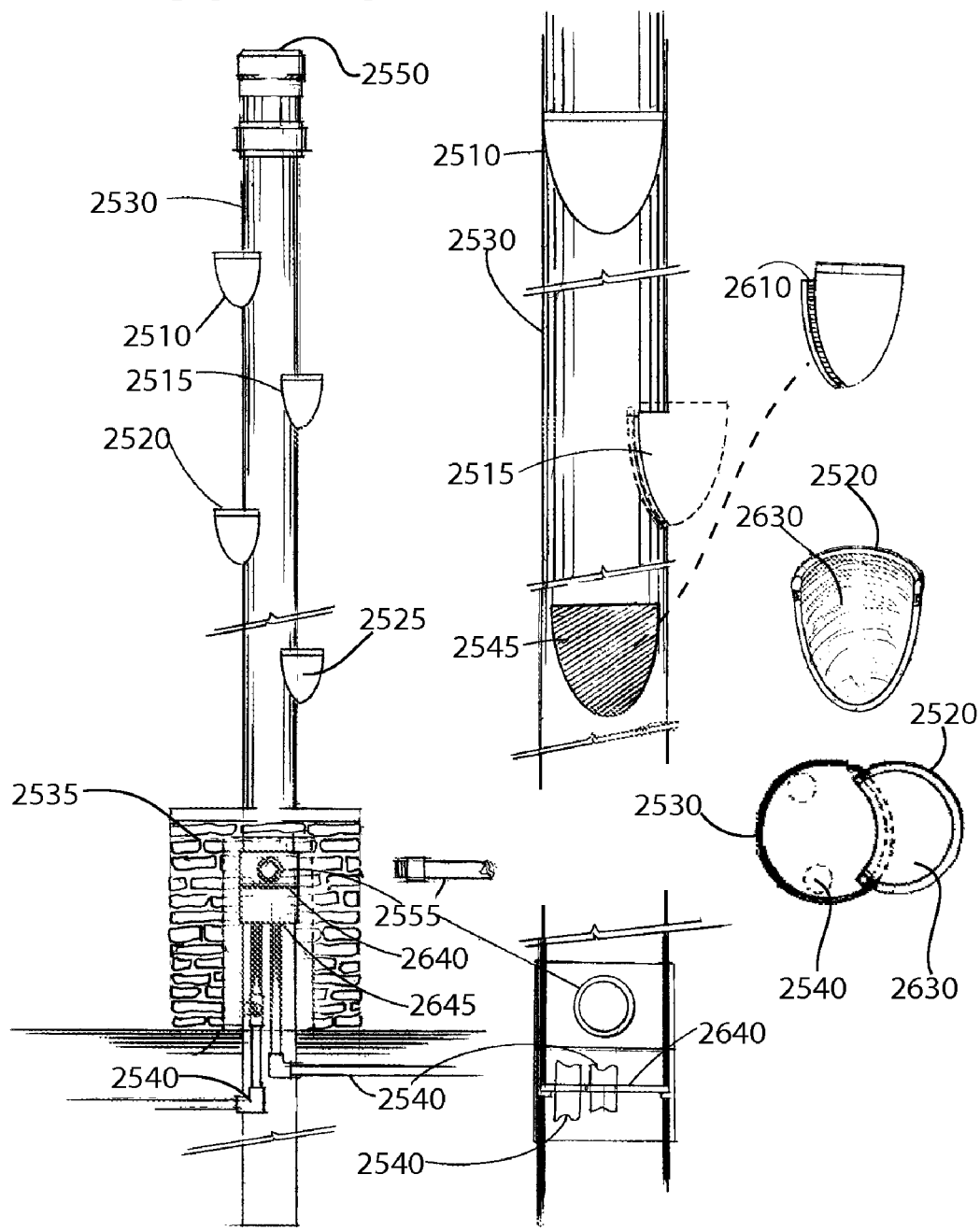
FIG. 45 shows a front plan view of portion of an exemplary planter assembly releasably integrated with a support structure primarily by releasable and penetrable engagement that is sufficient to support the planter without requiring conventional attachment devices according to principles of the invention.
FIG. 46 shows a front view of components and a portion of an exemplary planter for releasable integration with a support structure primarily by releasable and penetrable engagement that is sufficient to support the planter without requiring conventional attachment devices according to principles of the invention.

Referring now to FIGS. 45 and 46, another exemplary planter assembly with backless planters 2510, 2515, 2520 and 2525 configured for releasable integration with a support structure 2530 primarily by releasable and penetrable engagement that is sufficient to support planters 2510, 2515, 2520 and 2525 without requiring conventional attachment devices are shown. Four planters 2510, 2515, 2520 and 2525 are shown releasably mounted to the support structure 2530, which is a circular cross section hollow pole 2530. One planter 2520 is shown removed from a slot 2545 to illustrate the engagement portion 2610 (e.g., a rim configured to slide into a slot, such as unoccupied slot 2545. A decorative cover 2550 is mounted atop the support structure 2530, and a brick support base 2535, are provided. Each planter includes an open cavity 2630 as a receptacle for plants. The cavity is backless allowing the interior of the support structure 2530 to function as part of the planter. The rim 2610 is configured to avoid electrical or plumbing components (e.g., pipes 2540, conduit and/or wires) in the center of the support structure 2530. An engaged portion 2610 of the planter includes a rim configured to grip the side edges of the engagement slot or cavity 2545. Thus, the planter 2520 is snap fit into the cavity 2545. While a releasably engaged planter 2510, 2515, 2520 and 2525 appears to be an integrated appendage of the support structure 2530, the planter 2510, 2515, 2520 and 2525 can be removed by deforming the engaged portion 2610 to release from the engaged edges of the cavity 2545, such as through squeezing, prying and pulling action.

Now referring to FIGS. 47, 48 and 49, an exemplary releasably integrated planter container with an optional irrigation subsystem is conceptually shown. FIG. 47 shows an assembled unit. FIG. 48 provides a top view section of the planter container. FIG. 49 provides an separated view. A support structure comprising a post or pole of any shape or size 4920 is fluted, with a plurality of flutes, each of which is as wide or long as necessary 4922, as if by a router, and notched sideways at the bottom of the flute 4925 for round shaped poles or remaining straight for square poles. A Bundt style planter container with matching male appendages of any matching width or length 4942 slides over the pole to the bottom of the fluted female opening in an ever tightening tolerance and either engages there resting or if a round pole or post is turned to further engage the pole. An optional irrigation line 4950 per the embodiments passes to the top where a plurality of sprinkler heads can be attached using a variety of standard irrigation fittings per other embodiments. This sprinkler head as shown 4910 can be a pop-up rotator or rotary sprinkler head. It is further modified using microirrigation components, such as rigid tubes 4905 screwed into the sprinkler casing and a plurality of tips 4906 which can be variably controlled to drip, bubble, mist or spray the planter container. Additionally a flexible ¼ inch micro irrigation tube 4907 can be directed back down inside the pole 4920 to additional releasable integrated planter containers which may be used per the other embodiments in the pole or post. A cap 4920 can be used at the top fitting over the pole with a hole allowing the sprinkler head to penetrate through it. If the pole were PVC a standard end cap with a hole would be used. Drainage of excess water in the planter container per the embodiments can be out the lower side on the container or used down through the bottom into the pole to the ground or also used to further irrigate other releasable planter containers on the pole.

Now referring to FIGS. 50, 51, 52, 53, 54, 55, and 56 various Bundt style planter containers releasably integrated into poles and/or posts are shown. FIGS. 50 and 51 are angular and top views of the same releasable integrated planter container 5040 with male fitting appendages 5042 of any width or length fitting into a pole 5020 with matching integrating and engaging female features 5022. FIG. 50, the angular view, demonstrates how a square pole of any material, and in this example wood, can also be fluted as in the previous Figures. FIG. 52 is an example of a Bundt-style planter container 5240 with an end on the top 5245 which can optionally include a hole 5260 for an irrigation pipe and system to water the container and/or the surrounding area per other embodiments. The unit can be designed for any shape pole 5220 including round or square. The throat of the Bundt tube continues to narrow at the top to engage the pole or post. FIG. 53 is an example of a Bundt style planter container 5340 that also slips over the top of any shaped pole 5320 as in this drawing is square with a returned lip 5345 or 5350 that engages the material of the post. Further shown in FIG. 54 the lip is bent narrower 5345 to hook the top or end of the post or pole. If the post or pole end is solid, a slot can be cut into the post or pole 5355 to receive the wider or more open lip 5350. Irrigation can be added also, as per the embodiments described above. FIG. 55 is an example of the Bundt styled planter container with a recessed top platform 5545 creating a water reservoir 5545 when using an optional irrigation system for the container and the surrounding area. A hole 5560 in the platforms bottom allows the irrigation pipe 5570 through the container for a plurality of sprinkler head and micro irrigation options per the embodiments. The retention area can further be used as a water source for the container with perforations on the sides next to the bottom 5545. The retention area can also be fed to any other releasable planter containers located further down the pole per the various embodiments. FIG. 56 depicts a Bundt style planter container that features engagements with a slot in the pole or post and an appendage engaging 5645 into the slot as in FIG. 1 with the container 5640 in two halves. This unit, as well as others with solid poles or posts, may use micro irrigation for the container with ¼" flexible tubes continuing from the ground up the poles or posts to the containers. Optionally FIG. 56 can be any size or shape including open four sided or round hollow pole or post of variable materials featuring other embodied irrigation systems. Other irrigation options for the container and surrounding area are through the PVC or other water pipes per the embodiments at 5270, 5370, and 5570. Drainage of the containers are by a plurality of the embodiments.

Now referring to FIGS. 57 and 58, examples of a releasable integrated planter container side view cut away in FIG. 57 and a top view of the container in FIG. 58 are shown. The container 5740 can be built in halves or in quarters as show by the dotted lines 5745. The planter container sections are inserted into the top of an open pole or post 5725. The engagement integrating the two occurs by an ever tightening tolerance moving down through the pipe or pole. In this example the pole and planter are round, however many other shapes can be used. Irrigation for the planter container and/or surrounding area and drainage of the container is accomplished in a plurality of methods per the embodiments.

Now referring to FIGS. 59, 60, 61, 62 and 63 other examples of releasable integrated planter containers are shown. The planter container in FIG. 59 can be engaged in the open pole or posts 6020 in FIG. 60 using a patterned female feature 5945 at the bottom of the container 5940 which engages over the post or pole with a matching female fluted slot 6045 in the pole. FIG. 61 repeats the same engagement of the planter container 5940 with a solid pole featuring crossing slots cut into the end 6145. FIGS. 62 and 63 uses a container 6240 shown as a partial bottom area similar to 5940. A plurality of male appendages 6245 of a variety of shapes inside the bottom of the container are engaged into matching female slots or flutes 6345 in the pole or post wall and turned into stronger integrating position. All of these embodiments can use a plurality of shapes for containers or the pole or posts with irrigation and drainage methods per the embodiments.

Now referring to FIGS. 64, 65, and 66, examples of the different shapes and forms that can be used are conceptually illustrated. Specifically, by way of example, a square version of the embodiment of FIGS. 59, 60 and 61 is shown. The planter container 6440, female engage design 6445 and the male 6545 using both an open pole or post FIG. 65 or a solid unit FIG. 66. A plurality of irrigation and drainage features can be used per the embodiments.

Now referring to FIGS. 67 and 68, a container 6740 with the bottom only featuring male appendages 6745 which engage the pole or post 6820 by going over the top and lowering into angled slots 6845 which narrow at the bottom entering into a matching hole engaging the container and structure, is shown. The pole or post structure in this example may be a flexible plastic or vinyl allowing the larger male feature 6745 to push through the smaller slot into the matching hole 6846. A plurality of irrigation features can be used per the embodiments.

Figure 69:
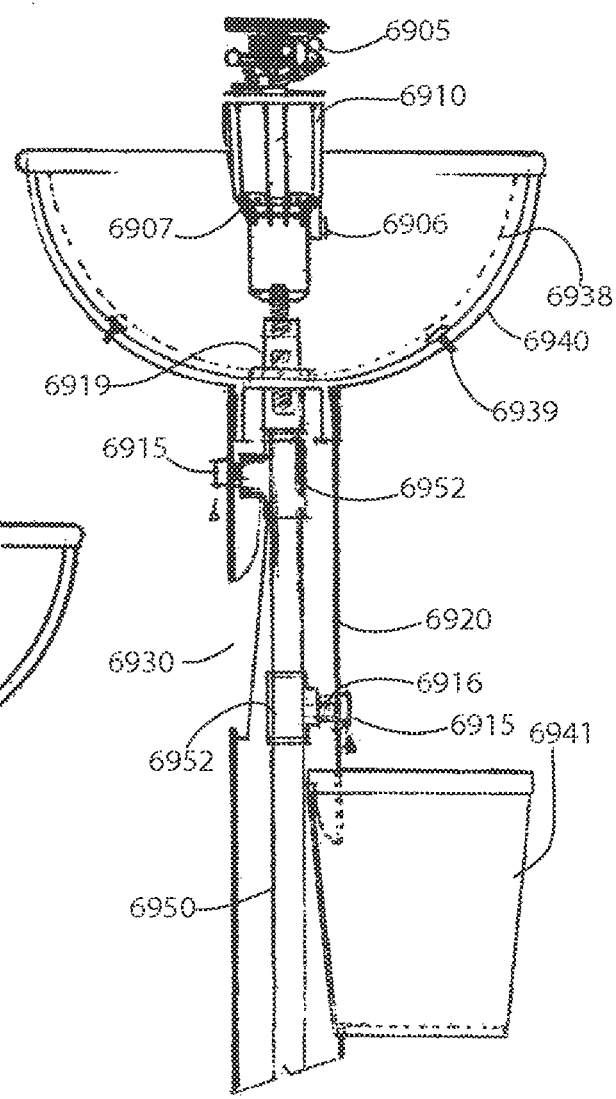
FIG. 69 shows a front section view of an exemplary planter assembly with an irrigation system and a planter configured for releasable integration with a support structure primarily by releasable and penetrable engagement that is sufficient to support the planter without requiring conventional attachment devices according to principles of the invention.

Now referring to FIG. 69, releasable structural planter containers integrated into a structure with irrigation of the containers and surrounding area is shown. This embodiment is similar to the embodiments shown in FIGS. 27-33, however this embodiment features both a releasable planter container 6941 engaged into the pole or post 6920 as the opening 6930 using the same irrigation bubbler, drippers or sprayers 6915 as in FIG. 33 and a larger releasable integrated planter container on the top of the post or pole featuring a rotating pop-up impulse sprinkler 6905. The top container is irrigated through the excess wasted water draining out the casing 6906 through the slots 6907. Depending on pressure in the irrigation line 6950, the container can receive 2-4 gallons of water per hour. Excess flow can be drained off at 6939 which features a screen on the inside and with the coco liner 6938 filters clogging impurities out. A reservoir of water is created at the bottom below the drains 6939. The PVC irrigation line 6950 uses a variety of standard fittings as the 6915 T's with threaded connectors 6916 and others including washers as shown at 6919. A side port 6906 is not used in this example. This Figure shows the many combinations of the various embodiments which can be used.

Figure 70:
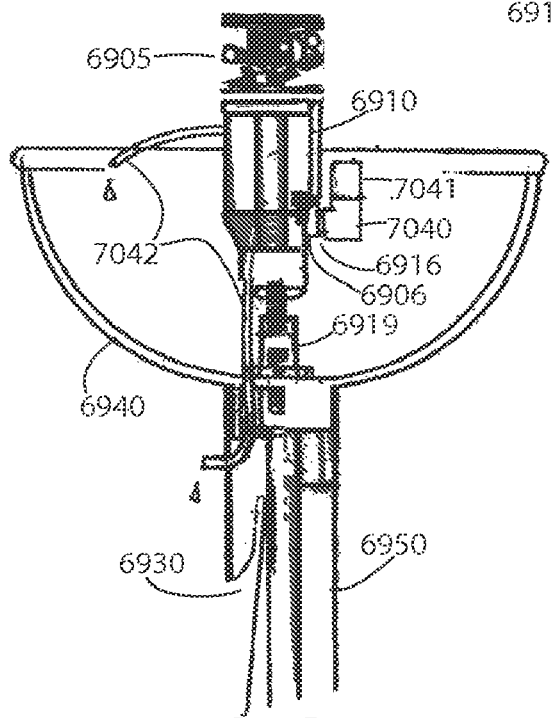
FIG. 70 shows a front section view of top portion of an exemplary planter assembly with an irrigation system and a planter configured for releasable integration with a support structure primarily by releasable and penetrable engagement that is sufficient to support the planter without requiring conventional attachment devices according to principles of the invention.

Now referring to FIG. 70 combinations of various embodiments which can be used are illustrated. A side port 6906 on the pop-up rotating impulse sprinkler is used and a threaded connector 6916 attaches a standard elbow fitting to a standard micro irrigation 25 PSI regulator 7041. A plurality of standard micro irrigation parts can be attached to the regulator to provide and control water to the releasable integrated planter container on top while the excess over flow waste can be tapped out of the casing to other locations as desired through standard micro irrigation connections and ¼" flexible tube 7042.

Figure 71:
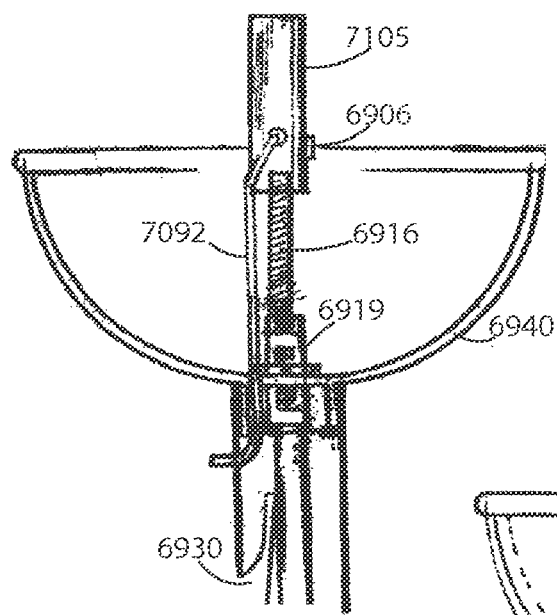
FIG. 71 shows a front section view of top portion of an exemplary planter assembly with an irrigation system and a planter configured for releasable integration with a support structure primarily by releasable and penetrable engagement that is sufficient to support the planter without requiring conventional attachment devices according to principles of the invention.

Now referring to FIG. 71, combinations or various embodiments which can be used are shown. A pop-up rotator sprinkler head, rotary sprinkler head, or any variety of other sprinkler heads slave water to the lower or other areas.

Figure 72:
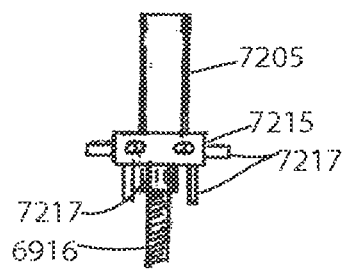
FIG. 72 shows a front section view of a portion of an exemplary irrigation system configured for use with a planter assembly according to principles of the invention.

Now referring to FIG. 72, a combination of a regular high pressure pop-up rotating sprinkler head and a low pressure micro irrigation muffler/emitter 7215 with variable control valves 7217 is shown. An optional nozzle attachment 7218 for easy attachment is also used. The unit can be made as one piece, combining 7205 and 7215 or two separate connection pieces. Due to the uniqueness of the releasable integrated planter containers optionally watering the container and surrounding area nothing exists in the standard irrigation lines of high pressure or the lower pressure of micro irrigation parts and accessories to provide a compact unit that passes high pressure water flow through an emitter/muffler to the sprinkler head for the surrounding area above or below it other than as shown on the previous embodiments. Many microirrigation emitter/mufflers include their own 25 PSI regulator built into the unit but are always located at the end of an irrigation line or branch as the final stopping point of fluid flow. A unit such as this would replace many of the enclosed irrigation embodiments.

In yet another embodiment, a support structure according to principles of the invention may support a releasably integrated vessel such as a planter or bird bath, as depicted in FIGS. 69-71. In the case of a bird bath, the vessel 6940 may be shallower than a planter. Irrigation in the form of one or more sprinklers, such as the sprinklers conceptually shown in the Figures, may be provided to supply water to the vessel 6940 and irrigate surrounding terrain.

Figures 73, 74:
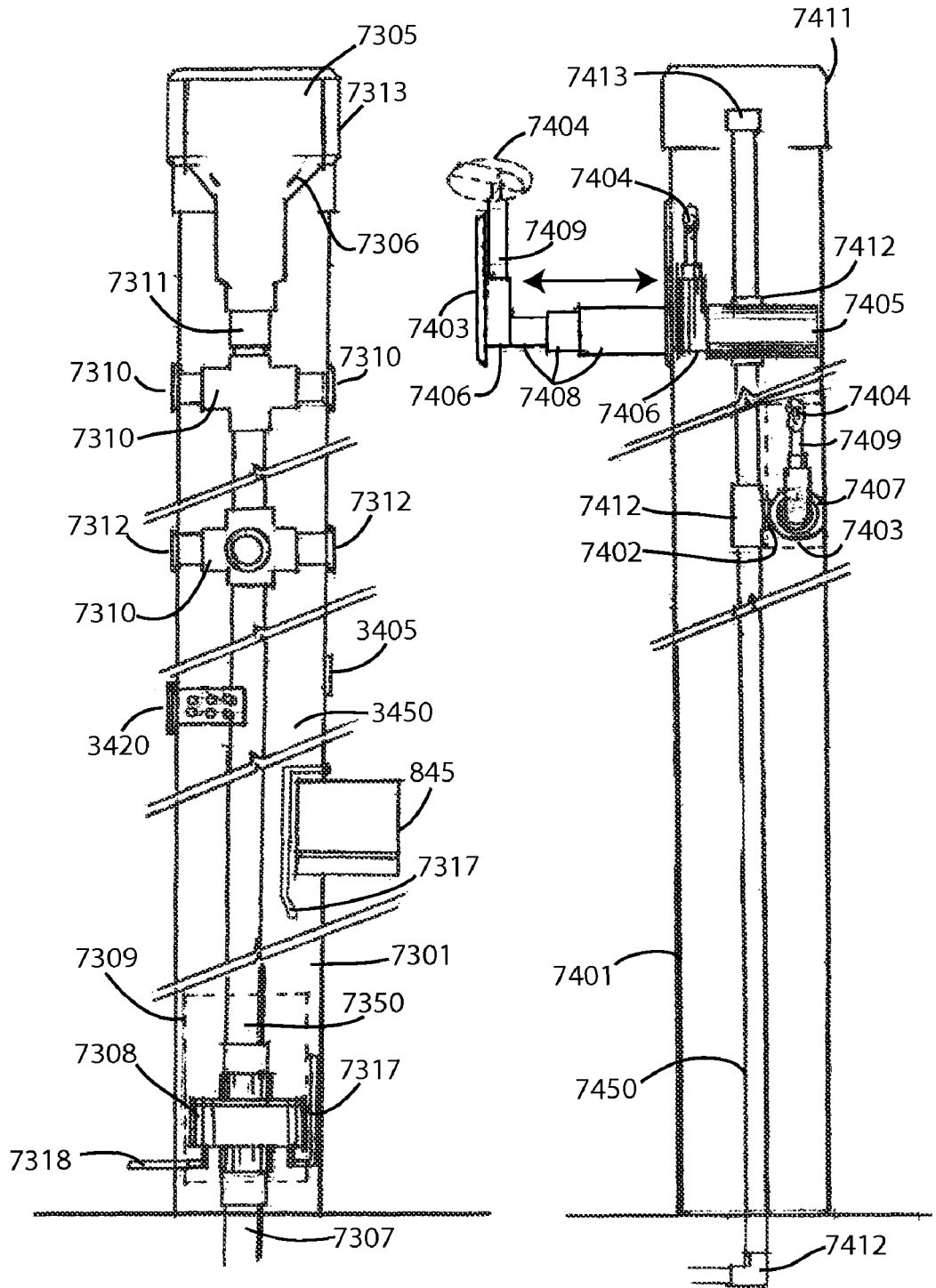
FIG. 73 shows a front section view of a portion of an exemplary integrated planter and irrigation system according to principles of the invention.
FIG. 74 shows a front section view of a portion of an exemplary telescoping irrigation system configured for use with a planter assembly according to principles of the invention.

Referring now to FIG. 73 a front section view of a portion of an exemplary integrated planter and irrigation system according to principles of the invention is conceptually illustrated. A water supply conduit 7307 is connected to a water supply conduit 7350 contained within the support pole 7301. A micro-irrigation system including a muffler 7317 is connected to the water supply conduit 7307 and configured to supply low volume, low pressure water to plants via one or more outlet lines 7317, 7318. Conventional sprinklers 7305 and/or misters 7312 are also fluidly coupled to supply water to the planters and/or surrounding terrain. Drip slots 7306 in the rotary impact sprinkler 7305 drip supply water to planters below. A cap 7313 secures the sprinkler 7305 to the top of the pole 7301. Any other water delivery means suitable for use with assemblies and/or surrounding terrain in accordance with principles of the invention may be utilized and are intended to come within the scope of the invention. A plurality of junctions 7310, 7311 fluidly couple the misters 7312 to the supply conduit 7350. One or more removable access doors 7309 provide access to the interior of the pole 7301. Any of a plurality of releasably integrated planters 845, 3405, 3420, as described herein, may be releasably engaged by the pole 7301 through corresponding apertures and slots.

Referring now to FIG. 74, a front section view of a portion of an exemplary telescoping irrigation system configured for use with a planter assembly according to principles of the invention is conceptually illustrated. An external water supply conduit 7412 is connected to an internal water supply conduit 7450 contained within the support pole 7401. One or more telescopically deployed, spring-retracted sprinkler assemblies 7407 are provided to irrigate surrounding terrain and planters. A plurality of couplings, joints and end caps 7402, 7413 are provided to configure the plumbing. Horizontal and vertical telescopic sections 7408, 7409 extend under the influence of water pressure. Internal springs urge the telescopic sections 7408, 7409 to a retracted configuration when the water pressure is relieved, causing the horizontal sections to collapse substantially into a container 7405 and reside within the pole 7401. A right-angle joint 7406 couples the horizontal and vertical sections 7408, 7409. A covering 7403 shaped to cover an aperture through which the telescoping sprinkler assembly 7407 travels is attached to the outboard side of the sprinkler. A stationary or rotary nozzle assembly 7404 may be provided to achieve a desired irrigation pattern. A top cap 7411 protects the interior compartment of the pole 7401.

With reference to FIGS. 75 through 76, a planter assembly 7500 having separable sections 7506, 7508 releasably integrated with a support structure such as a light pole 7501 primarily by releasable and penetrable engagement that is sufficient to support the planter without requiring conventional attachment devices according to principles of the invention is shown. A releasably integrated planter 7500 is shown mounted to the support structure 7501, which is a fluted light pole, as illustrated in FIGS. 75 and 78. The planter 7500 is shown removed from the pole 7501 to illustrate the apertures 7504 (i.e. slots) in the pole 7501 as well as the engagement corresponding engagement hooks 7707 of the planter 7500 configured to mate with the apertures 7504. Each section 7506, 7508 of the planter 7500 includes a channel configured to enable the planter sections to abut each other and define a central channel through which an engaged portion of the pole 7501 is received. A functional accessory, such as a light 7503, is mounted atop the support structure 7501. A base 7502 is provided at the bottom of the support pole 7501. As discussed herein, functional accessories other than a lighting assembly may include a birdbath, a planter, or a bird house. Other fixtures such as sign poles and/or irrigation outlets 7515 may also be provided. While the releasably engaged planter 7500 appears to be an integrated appendage of the support structure 7501, the planter can be removed simply by lifting the planter to release the hooks 7707 from the apertures 7504, thereby separating and disengaging each section of the planter 7500.

With reference to FIGS. 79 through 83, a planter assembly 7900 having releasably integrated with a support structure such as a light pole 7901 primarily by releasable and penetrable engagement that is sufficient to support the planter without requiring conventional attachment devices according to principles of the invention is shown. A releasably integrated planter 7900 is shown mounted to the support structure 7901, which is a fluted light pole, as illustrated in FIGS. 79, 80 and 82. The planter 7900 is shown removed from the pole 7901 to illustrate the central aperture 8000 and engagement hooks 8106 and/or prongs 8307 configured to releasably mate a with a collar 8200 having a support rim and/or slots 8007. The collar includes channels 8020, 8220 to allow passage of the engagement hooks 8106 and/or prongs 8307 for lowering of the planter 7900 when the planter 7900 is aligned for lowering. Lowering facilitates maintenance. A functional accessory, such as a light 7903, is mounted atop the support structure 7901. A base 7902 is provided at the bottom of the support pole 7901. As discussed herein, functional accessories other than a lighting assembly may include a birdbath, a planter, or a bird house. Other fixtures such as sign poles and/or irrigation outlets may also be provided. While the releasably engaged planter 7900 appears to be an integrated appendage of the support structure 7901, the planter can be lowered simply by lifting the planter to release the or disengage the rime of the collar 8020, 8220 and then aligning the hooks and/or tabs 8106, 8307 with the channels 8020, 8220.

With reference to FIGS. 84 through 90, a planter assembly 8400 having releasably integrated with a support structure such as a light pole 8401 primarily by releasable and penetrable engagement that is sufficient to support the planter without requiring conventional attachment devices according to principles of the invention is shown. A releasably integrated planter 8400 is shown mounted to the support structure 8401, which is a fluted light pole, as illustrated in FIG. 84. The planter 8400 is shown removed from the pole 8401 to illustrate the central aperture 8502 defined by separable portions. A bottom engagement neck 8501 with a plurality of neck tabs 8502 engages a lower engagement collar 8404 attached to the pole 8401. A hooked engagement sleeve 8502 is received in a hook engagement collar 8403 with a slot 8711 at the top of the planter. A threaded attachment 8405, 9014, 9016, 9017 secure the collar 8403 to the pole 8401. A functional accessory, such as a light 8406, is mounted atop the support structure 8401. A base 8402 is provided at the bottom of the support pole 8401. As discussed herein, functional accessories other than a lighting assembly may include a birdbath, a planter, or a bird house. Other fixtures such as sign poles and/or irrigation outlets may also be provided. While the releasably engaged planter 8400 appears to be an integrated appendage of the support structure 8401, the planter can be lowered simply by lifting the planter to release the or disengage the rim of the collar.

With reference to FIGS. 91-97 a vinyl fence pole assembly is shown which irrigates the surrounding area and as a support structure optionally can receive a releasable and penetrable planter container without requiring conventional attachment devices according to principles of the invention with the enclosed embodiments. FIG. 91 shows a side cutaway profile of the vinyl fence pole 9101 with a simulated or natural wood insert panel 9103 matching fence pickets. FIGS. 92-96 are a top view cut away of the infinite plurality and variety of extruded vinyl poles shapes, sizes and corners that can be utilized for the insert panels 9103. In FIG. 91 the irrigation conduit 9105 is depicted with various standard fittings 9107 for above ground and 9108 below ground hook up. Standard fitting 9109 allows for a threaded connector 9110 to a plurality of pop up rotating sprinkler heads 9120 that can be used. Alternatively any variety of embodied irrigation and planter container programs can be used. A top cap 9130 seals the fence poles interior and a hole can be made in the top to accommodate a sprinkler head. The top of the sprinkler casing 9121 covers the hole. The interior of the fence poles 9140 may contain filler materials, such as foam 9142 in FIG. 92, 94, or 97, which hold the irrigation conduit assembly with the sprinkler head in place. In addition, one or more wood boards 9160 may be contained for structural support and secure attachment of fence sections, gates and accessories as shown in FIGS. 92, 94, 95, 96, and 97. FIG. 92 shows inserted panels 9103 around all 4 sides and four (4) different corner edges that can be used 9150. Each pair of corner edges 9150 on a side of the pole defines a channel for receiving 9103. FIG. 93 shows a top view of the vinyl extruded fence pole frame without panels or fillers and with four (4) varieties of corners 9150. The pole conceptually illustrated in FIG. 94 contains foam 9142 and wood boards 9160, making it suitable for use as an attachment post for gates or other accessories. FIG. 95 features blank panel insert slots 9103 on two perpendicular adjacent sides, creating a flat surface that can be used for a corner on the other two sides. The pole in FIG. 95 also features a clamp 9512 to hold the irrigation assembly in position with or without other fillers. The pole in FIG. 96 features a single flat back, making it suitable for locations requiring irrigation and section attachments. It demonstrates other types of container strips/corner configurations for panel inserts as 9601, which is slightly recessed and 9602 which is flat to the back. It also demonstrates a different clamp 9602, as in FIG. 95. FIG. 97 is a top view cutaway of a vinyl fence pole without insert panels, which can also be used for irrigating the surrounding area. While vinyl is a preferred composition, the invention is not limited by the material, shapes or sizes. Additionally, the insert panels and interior structural wood support can be glued, stapled, nailed or attached in any other suitable manner to the extruded structure as necessary.

Figures 98, 99:
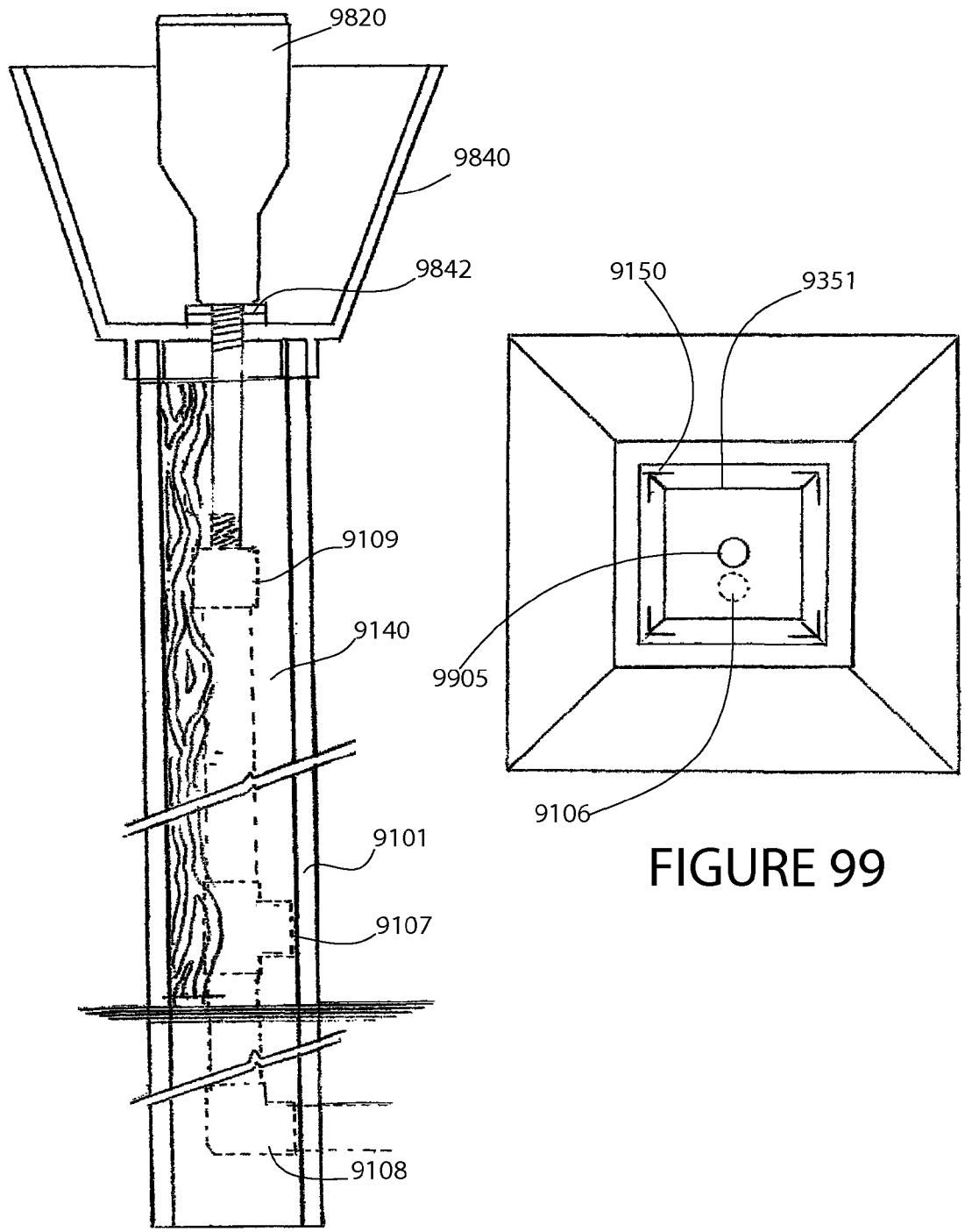
FIG. 98 conceptually illustrates a releasable and penetrable planter container on top of a fence pole structure in accordance with FIG. 91, in accordance with principles of the invention.
FIG. 99 conceptually illustrates a bottom view of the planter of FIG. 98, in accordance with the principles of the invention.

With reference to FIGS. 98 and 99, a releasable and penetrable planter container may be added on top of the fence pole structure in FIG. 91. The pole is sufficient to support the planter without requiring conventional attachment devices according to principles of the invention. The top cap 9130 in FIG. 91 is omitted and a releasable planter container 9840 engages the top 9101 of the structure, with female matching engagement 9150 and 9151 in FIG. 99, which is a bottom view of the planter. A variety of drainage and other features as described above may be adapted for use with this embodiment, Any variety of sprinkler heads as 9820/9121. A hole in the planter base 9905 or alternate holes as 9106 can be utilized to match the poles internal sizes and locations.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A planter assembly comprising a planter configured for releasable integration with a support structure,
    said planter including an external portion and an engaged portion, said engaged portion having an upper engaged edge and a lower engaged edge,
    said support structure including a cavity shaped and sized to receive and securely and releasably engage the upper engaged edge of the engaged portion and the lower engaged edge of the engaged portion of said planter, said upper engaged edge and lower engaged edge being shaped and sized to be received and securely, supportively and releasably engaged in the cavity of the support structure without using requiring any separate fastener to secure the planter to the support structure, said external portion of the planter extending from the engaged portion and being outside the cavity, said external portion defining a compartment for holding a plant, said engaged portion being contained within the cavity,
    said upper engaged edge of the planter having a pair of spaced apart vertical slots of a determined upper length, a top of each vertical slot being at the upper engaged edge, a bottom of each vertical slot being between the upper engaged edge and the lower engaged edge,
    said support structure having a mounting surface, said cavity being formed in the mounting surface of said support structure, wherein said cavity comprises a cutout formed in said mounting surface, said cutout including a base opening having a cutout height, the engaged portion of the planter having a first height from the upper engaged edge to the lower engaged edge and a second height from the bottom of each vertical slot to the lower engaged edge, the first height of the engaged portion of the planter being greater than the cutout height, and the second height of the engaged portion of the planter being less than the cutout height, said vertical slots being configured to allow the upper engaged edge to be lifted into position and thereby provide clearance for lower engaged edge to fit within the cutout.

2. A planter assembly comprising a planter configured for releasable integration with a support structure as in claim 1, said base opening including spaced apart longitudinal upper slots having an upper length, and spaced apart longitudinal lower slots having a lower length.

3. A planter assembly comprising a planter configured for releasable integration with a support structure as in claim 2, said base opening having a width, said planter having a diameter that is greater than the width of the base opening.

4. A planter assembly comprising a planter configured for releasable integration with a support structure as in claim 1, said support structure containing an irrigation system, said irrigation system comprising a fluid conduit with an inlet and an outlet, a liquid emitting device fluidly coupled to said outlet and configured to irrigate the planter.

5. A planter assembly comprising a planter configured for releasable integration with a support structure as in claim 1, said support structure containing an irrigation system, said irrigation system comprising a fluid conduit with an inlet and an outlet, a liquid emitting device fluidly coupled to said outlet and configured to irrigate the planter and surrounding terrain.

6. A planter assembly comprising a planter configured for releasable integration with a support structure as in claim 1, said support structure containing an irrigation system, said irrigation system comprising at least one irrigation device from the group consisting of a sprinkler, a microirrigation muffler, a microirrigation emitter, a constant flow valve, a variable flow valve, a misting device, and a nozzle, said irrigation means being configured to irrigate the planter.

7. A planter assembly comprising a planter configured for releasable integration with a support structure as in claim 6, said irrigation system further comprising at least one irrigation device from the group consisting of an impact sprinkler, a rotary sprinkler, a pop-up sprinkler, a microirrigation sprinkler and a misting device, said irrigation device being configured to irrigate surrounding terrain.

8. A planter assembly comprising a planter configured for releasable integration with a support structure as in claim 1, said upper engaged edge being substantially continuous.

9. A planter assembly comprising at least one planter configured for releasable integration with a support structure, each of said at least one planter comprising an open end receptacle having a base and a continuous peripheral wall, the base closing one end and the continuous peripheral wall defining an open end opposite the base, said continuous peripheral wall consisting of an external portion and an engaged portion, said engaged portion having a first engaged edge, a second engaged edge, and a first width across the engaged portion, and said external portion of each of said at least one planter having a second width across the external portion at least as wide as the first width, and said at least one planter not requiring any attachment device to the support structure except for the engaged portion; and said support structure being hollow with an exterior surface and having at least one planter engaging fenestra; and said at least one planter engaging fenestra being shaped and sized to receive the engaged portion of said at least one planter; said at least one planter engaging fenestra having a first edge, and an opposite second edge spaced apart from the first edge, and a pair of spaced apart side edges adjoining the first edge and second edge, the distance between the spaced apart side edges being about the first width; said at least one planter engaging fenestra providing a passage from an exterior space, through the exterior surface, leading to an interior cavity behind the exterior surface; and said fenestra securely, supportively, and releasably engaging the first engaged and second engaged edge of the engaged portion without requiring any separate fastener to secure the planter to the support structure; and said at least one planter engaging fenestra including a pair of spaced apart slots extending from at least one of the first edge and second edge of said at least one planter engaging fenestra; and said engaged portion and a portion of the base of said at least one planter coextensive with the engaged portion both being receiving in the interior cavity behind the exterior surface; said external portion extending from the engaged portion and being in the exterior space; and said external portion defining a compartment for holding a plant and, when viewed from the exterior space, said support structure substantially concealing the engaged portion of the planter received through the fenestra to provide an integrated appearance.

10. A planter assembly comprising at least one planter configured for releasable integration with a support structure as in claim 9, said support structure comprising a hollow vertical pole.

11. A planter assembly comprising at least one planter configured for releasable integration with a support structure as in claim 10, said hollow vertical pole having a noncircular cross sectional shape.

12. A planter assembly comprising at least one planter configured for releasable integration with a support structure as in claim 9, said spaced apart slots extending from at least one of the first edge and second edge of said at least one planter engaging fenestra comprising spaced apart longitudinal first slots having a first length and spaced apart longitudinal second slots having a second length.

13. A planter assembly comprising at least one planter configured for releasable integration with a support structure as in claim 9, said fenestra having a width, said at least one planter having a diameter that is greater than the width of the fenestra.

14. A planter assembly comprising at least one planter configured for releasable integration with a support structure as in claim 9, said support structure including an irrigation system, said irrigation system comprising a fluid conduit with an inlet and an outlet, a liquid emitting device fluidly coupled to said outlet and configured to irrigate the planter.

15. A planter assembly comprising at least one planter configured for releasable integration with a support structure as in claim 14, said liquid emitting device fluidly coupled to said outlet being configured to irrigate the planter and surrounding terrain.

16. A planter assembly comprising at least one planter configured for releasable integration with a support structure as in claim 14, said liquid emitting device comprising an emitter from the group consisting of a sprinkler, a microirrigation muffler, a microirrigation emitter, a constant flow valve, a variable flow valve, a misting device, and a nozzle.

17. A planter assembly comprising at least one planter configured for releasable integration with a support structure as in claim 14, said irrigation system further comprising at least one irrigation device from the group consisting of an impact sprinkler, a rotary sprinkler, a pop-up sprinkler, a microirrigation sprinkler and a misting device, said irrigation device being configured to irrigate surrounding terrain.

18. A planter assembly comprising at least one planter configured for releasable integration with a support structure as in claim 9, said first engaged edge being substantially continuous.

19. A planter assembly comprising at least one planter configured for releasable integration with a support structure as in claim 9, said second engaged edge including a notch.

20. A planter assembly comprising at least one planter configured for releasable integration with a support structure as in claim 9, said first engaged edge including a slot.

21. A planter assembly comprising at least one planter configured for releasable integration with a support structure as in claim 9, wherein said external portion defining a compartment for holding a plant comprises a rim.

22. A planter assembly comprising at least one planter configured for releasable integration with a support structure as in claim 9, said second engaged edge being substantially continuous.

* * * * *

UNITED STATES PATENT AND TRADEMARK OFFICE
CERTIFICATE OF CORRECTION

PATENT NO. : 8,136,296 B2
APPLICATION NO. : 12/026553
DATED : March 20, 2012
INVENTOR(S) : James P. Hogan Page 1 of 1

It is certified that error appears in the above-identified patent and that said Letters Patent is hereby corrected as shown below:

The word "using" is deleted from line 57 of column 31.

Signed and Sealed this
Thirteenth Day of November, 2012

David J. Kappos
*Director of the United States Patent and Trademark Office*